US010739256B1

(12) United States Patent
Rickman et al.

(10) Patent No.: US 10,739,256 B1
(45) Date of Patent: Aug. 11, 2020

(54) SPECTROSCOPY SYSTEM WITH BEAT COMPONENT

(71) Applicant: ROCKLEY PHOTONICS LIMITED, London (GB)

(72) Inventors: Andrew George Rickman, Marlborough (GB); Hooman Abediasl, Pasadena, CA (US)

(73) Assignee: ROCKLEY PHOTONICS LIMITED, London (GB)

( * ) Notice: Subject to any disclaimer, the term of this patent is extended or adjusted under 35 U.S.C. 154(b) by 0 days.

(21) Appl. No.: 16/370,861

(22) Filed: Mar. 29, 2019

(51) Int. Cl.
*G01N 21/35* (2014.01)
*G01N 21/3581* (2014.01)
*G01S 17/89* (2020.01)
*G01S 17/42* (2006.01)

(52) U.S. Cl.
CPC .......... *G01N 21/3581* (2013.01); *G01S 17/42* (2013.01); *G01S 17/89* (2013.01)

(58) Field of Classification Search
CPC ...... G01N 21/3581; G01S 17/89; G01S 17/42
USPC .................................................. 250/339.07
See application file for complete search history.

(56) References Cited

U.S. PATENT DOCUMENTS 9,476,981 B2 10/2016 Yaacobi et al.
2003/0179791 A1* 9/2003 Hiroshi ................. H01S 5/0687
372/29.011
2004/0013352 A1* 1/2004 Khayim ............... G02B 6/4215
385/24
2004/0090365 A1* 5/2004 Newberg ................. H01Q 3/22
342/368
2009/0022452 A1 1/2009 Welch et al.
(Continued)

FOREIGN PATENT DOCUMENTS

WO 2012/085596 A1 6/2012
WO 2016/070055 A1 5/2016
WO 2019/0077998 A1 1/2019

OTHER PUBLICATIONS

Annex to Form PCT/ISA/206 Communication Relating to the Results of the Partial International Search for International Application No. PCT/EP2018/068012 filed Jul. 3, 2018 on behalf of Rockley Photonics Limited, dated Oct. 15, 2018. 11 pages.
(Continued)

*Primary Examiner* — David P Porta
*Assistant Examiner* — Gisselle M Gutierrez
(74) *Attorney, Agent, or Firm* — Steinfl + Bruno, LLP

(57) ABSTRACT

A light ranging and detection system achieving reconfigurable very wide field of view, high sampling of spatial points per second with high optical power handling by using architecture to efficiently combine different wavelengths, time and frequency coding, and spatial selectivity. The transmitter is capable of generating multiple narrow beams, encoding different beams and transmitting in different spatial directions. The receiver can differentiate and extract range and reflectivity information of reflected beams. Three dimensional imaging of the environment is achieved by scanning the field of view of the transmitter. Control and signal processing electronic circuitries fabricated in a chip are packaged together with a chip containing the photonic components of the ranging system. The light ranging and detection system generates a THz beam in addition to an optical beam, and both beams combined allow reconfigurable spectroscopy.

7 Claims, 21 Drawing Sheets

(56) References Cited

U.S. PATENT DOCUMENTS

| | | |
|---|---|---|
| 2014/0211298 A1 | 7/2014 | Sayyah et al. |
| 2016/0119057 A1 | 4/2016 | Mekis et al. |
| 2016/0127044 A1* | 5/2016 | Ho .................... H04B 10/40 398/79 |
| 2017/0082601 A1 | 3/2017 | Welch et al. |
| 2017/0110850 A1 | 4/2017 | Li et al. |
| 2019/0004151 A1* | 1/2019 | Abediasl ............ G02B 26/0883 |
| 2019/0011639 A1* | 1/2019 | Abediasl ............... H01S 3/2391 |

OTHER PUBLICATIONS

International Search Report and Written Opinion for international Application No. PCT/EP2018/067496 filed Jun. 28, 2018 on behalf of Rockley Photonics Limited, dated Oct. 24, 2018. 15 pages.

International Search Report and Written Opinion for PCT/EP2018/066012, filed on Jul. 3, 2018, on behalf of Rockley Photonics Limited, dated Dec. 7, 2018. 16 pages.

Restriction Requirement for U.S. Appl. No. 16/026,953, filed Jul. 3, 2018 on behalf of Rockley Photonics Limited, dated May 29, 2019. 6 pages.

Abediasl, H. et al., "Monolithic Optical Phased-Array Transceiver in a Standard SOI CMOS Process", Optics Express, vol. 23, No. 5, pp. 6509-6519, (Mar. 2015).

Chung, S, et al., "A 1024-Element Scalable Optical Phased Array in 180nm SOI CMOS", IEEE International Solid-State Circuits Conference (ISSCC) Digest of Technical Papers, (Feb. 2017), 13 pages.

Muneeb, M., et al., "Silicon-on-insulator shortwave infrared wavelength meter with integrated photodiodes for on-chip laser monitoring" Optics Express, vol. 22, No. 22, p. 27300-27308 (2014).

Poulton, C.V. et al., "Optical Phased Array with Small Spot Size, High Steering Range and Grouped Cascaded Phase Shifters", In Integrated Photonics Research, Silicon and Nanophotonics Optical Society of America, (Jan. 2016), 4 pages.

\* cited by examiner

SPECTROSCOPY SYSTEM WITH BEAT COMPONENT

TECHNICAL FIELD

The present disclosure relates to LiDAR (Light Detection And Ranging) or three dimensional imaging and spectroscopy system.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
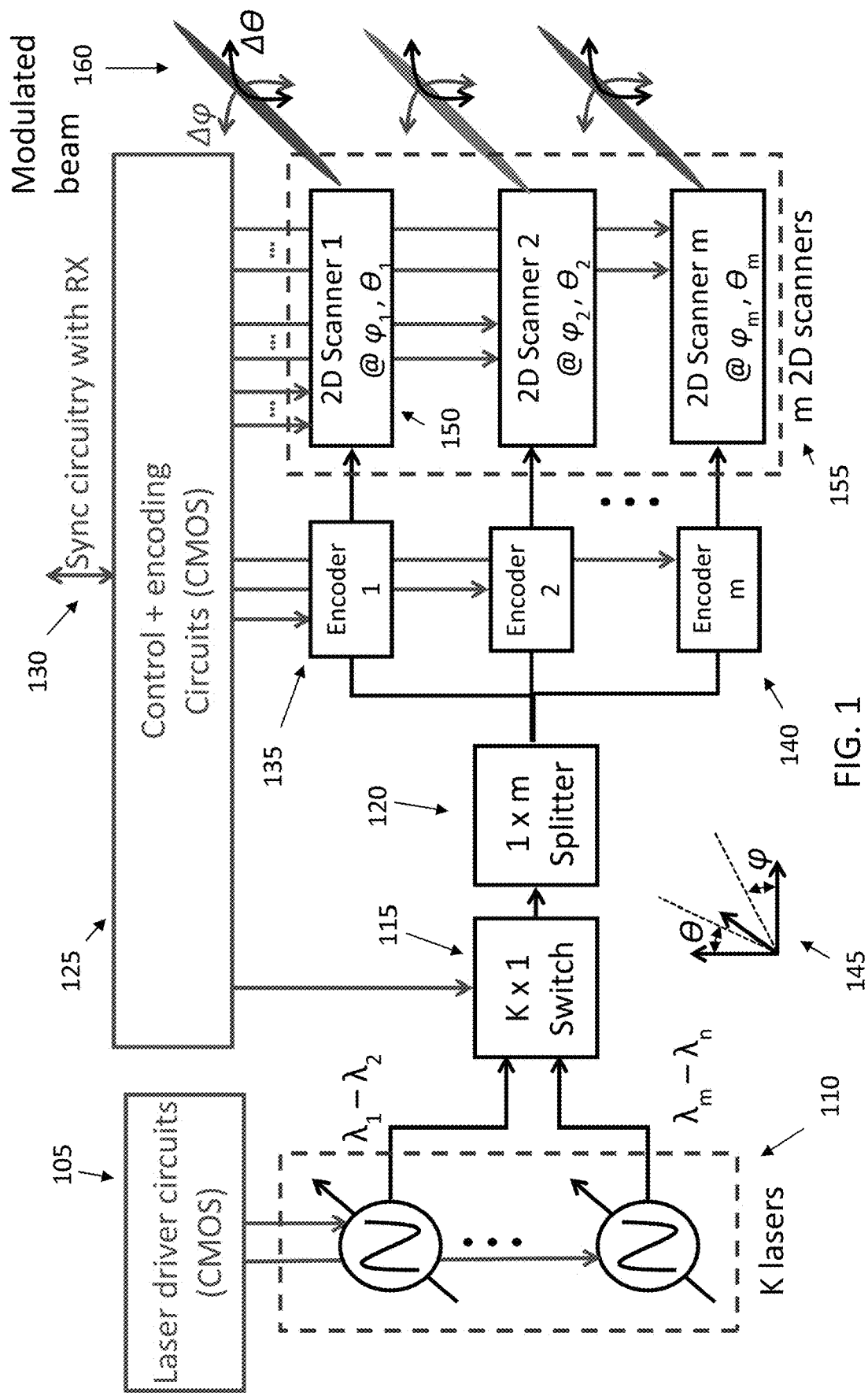
FIG. 1 illustrates an exemplary transmitter according to the present disclosure.

In a first aspect of the disclosure, a device is described, the device comprising imaging and spectroscopy systems.

In a second aspect of the disclosure, a method is described, the method comprising a reconfigurable spectroscopy system operating in both optical and THz radiation regimes.

In a third aspect of the disclosure, a system is described, the system comprising the device of the first aspect of the disclosure, and method of the second aspect of the disclosure.

DETAILED DESCRIPTION

The present disclosure describes an optical THz spectroscopy system. In particular, the system disclosed herein can advantageously scan a sample across its surface, by emitting an electromagnetic radiation beam at a specific point or region of the sample, across a plurality of wavelengths, and scan the beam at different points or regions of the sample. In some embodiments, each region of the sample is scanned across an entire wavelength range. In other words, in some embodiments, the beam remains aimed at the same region of the sample while the wavelength is varied; subsequently, the beam is moved to a different position and the wavelength is varied again. In some embodiments, the area scanned for each point or region of the scan is comparable to a lateral size of the beam. In some embodiments, the electromagnetic radiation of the beam is in the optical wavelength range, the THz wavelength range, or both. The THz system can be combined with a LiDAR system to carry out optical and THz spectroscopy. In the following, the LiDAR system is described first, followed by a description of the THz system. The two systems are combined to form the reconfigurable spectroscopy system of the present disclosure.

The present disclosure describes a scalable LiDAR (light detection and ranging) system comprising an optical phased array architecture. The system can comprise one or more lasers, switches or multiplexers (MUX) to select the lasers, splitters to split the lasers into multiple waveguides, one or more encoders to encode the laser signals, and one or more scanners which emit and adaptively shape beams in different directions, as well as associated control circuitry to operate the photonic components.

LiDAR systems can be used in a variety of applications, such as self-driving vehicles, assisted driving vehicles, mapping, sensors, cameras, drones and aerial vehicles in civilian and military applications as well as consumer devices such as, for example, smartphones or tablets. The systems may be modified according to the specific applications, depending on the resolution, power usage requirements, spatial detection requirements and other parameters. For example, in self-driving vehicles, the LiDAR system can provide a three dimensional map and image the environment surrounding the vehicle in real time, allowing the driving system to safely steer and control the vehicle. For example, self-driving cars can detect other cars, obstacles, pedestrians and other traffic, allowing a safe operation of the car. In some embodiments, consumer devices can use LiDAR to provide a three dimensional (3D) map of the environment up to a distance of multiple meters, for example less than 10 meters, or less than 20 meters. Three dimensional imaging devices, such as smartphones or tablets, typically require a more limited range than vehicles. These consumer devices typically use less power and comprise a smaller number of components, compared to vehicle LiDAR. For example, imaging devices for vehicles may consume tens of Watts, while imaging devices for consumer electronics such as smartphones may send out optical power of the order of milliWatts. The imaging devices for consumer electronics can map the environment surrounding the device, and create 3D images. These images can be used, for example, for video games, virtual reality, and facial recognition, for example for enhancing the security of a device.

The LiDAR system of the present disclosure may comprise a transmitter, a receiver or both a transmitter and a receiver. The system can modulate several parameters such as laser wavelength, spatial coordinates such as the angles of emission or reception, and encoding in the time domain through the laser signal shape and duration. In some embodiments, the transmitter may comprise an array of scanners oriented in different directions, in order to provide spatial selectivity for the emitted laser beams; the associated receiver can be broadband with wide field of view to collect all signals. The received signals can then be identified through decoding of the different parameters used to encode the signals. The decoding at the receiver allows the ranging information to be determined.

In other embodiments, the transmitter may be broadband with a wide field of view, while the receiver comprises an optical phased array to allow for the complex detection of the ranging information. In yet other embodiments, both the transmitter and the receiver may comprise encoding and manipulation of the several parameters listed above. As known to the person of ordinary skill in the art, a phased array comprises several radiating elements each operating at a different phase and/or amplitude. Beams can be formed as a result of changing relative phase and/or amplitude of the signal emitted from each radiating element, and/or steering the beams in a desired direction by providing constructive or destructive interference. In addition, changing the amplitude of each emitter independently can change the beam shape in the far field, e.g. increasing the directivity of the beam, or generating multiple beams in different directions. For example, a beam may comprise a main lobe and several secondary lobes at a lower intensity. In some embodiments, the beam may be shaped so as to have two or more main lobes of similar intensity. The main lobes, in this case, would have the same wavelength, and could be differentiated at the receiver if the receiver has spatial selectivity, for example by comprising at least two receivers, which will receive different signals from the environment reflections of the two main lobes. Alternatively, in other embodiments, two beams may be shaped at the same time, each at a different wavelength. In this case, for example, the receiver could distinguish the reflections from each beam due to their different wavelength. Such approaches can also be combined in more complex configurations, if it is advantageous for the specific application.

In some embodiments, the optical phased array operates at a wavelength between 1500 and 1600 nm, although any wavelength may be used. For example, a 1550 nm wavelength is advantageous, as it is safe for the human eye. Since LiDAR systems for self-driving vehicles may operate alongside human traffic, it can be important for the LiDAR system to operate efficiently at a wavelength that is safe for humans. For example, some existing systems operate at a wavelength of 904 nm. Compared to 904 nm, a 1550 nm wavelength allows approximately a 40× increase in power while remaining eye-safe, and approximately a 2× increase in ranging distance for the same amount of allowable eye-safe power. Additionally, using a 1550 nm wavelength allows the utilization of the great amount of technological research and expertise developed in the field of fiber optic communications. The LiDAR systems disclosed in the present disclosure are, in some embodiments, wavelength-agnostic, in the sense that they do not require operation at a specific wavelength but can work at multiple wavelengths, depending on the materials chosen for fabrication. In other words, the systems described herein can be limited to the supported wavelength range of materials used to fabricate the relevant chips, such as Si or SiN. It is known to the person of ordinary skill in the art that, for example, Si on insulator (SOI) supports a specific wavelength range (from 1200 nm to above 3000 nm). Therefore, if the LiDAR systems are fabricated in SOI it could support working in the wavelength range of that material. However, the LiDAR systems and methods described herein do not rely on a specific wavelength to be functional. Rather, the operating wavelength is selected according to the materials used for fabrication. Smaller wavelengths require tougher specifications for the fabrication process, as the operation of optical phased arrays is optimal when the pitch of the emitters is about half the operating wavelength.

Generally, existing LiDAR systems comprise two different ways of operation. In some systems, a flash LiDAR approach is used, where the transmitter floods the environment and the receiver has the spatial selectivity. These systems may incur a loss of resolution due to multiple reflections, possible interference between reflections, and resolution limitation due to physical sizes of the receivers. In other systems, the transmitter has spatial selectivity and the receiver is broadband with a wide field of view to maximize the received signal. Conventionally, a rotating mirror or liquid crystal has been used to steer the beam and create spatial selectivity.

In the present disclosure, a phased array system is used to provide spatial selectivity within a very wide scalable field of view and maximize throughput of the number of points that the imaging system can measure per second. Wavelength tuning is used to steer the beam in one direction. With current laser technology, it may be difficult to have wide tunability in a single laser, therefore a plurality of lasers may be used to allow the use of different wavelengths. The wavelength parameter can therefore be controlled, together with other parameters. Switches can be used to switch between lasers having a different wavelength, in order to select one or more wavelengths to be transmitted at any one time. For example, the system may switch ON one laser and OFF the remaining lasers, allowing the beam from that laser to enter the waveguides towards the phased array scanners. After a specified amount of time, the switch may cut off the beam and activate another beam. In some embodiments, more than one laser may be ON, the beams simultaneously pointing in different directions, thus allowing simultaneous emission of different wavelengths or wavelength bands. A splitter may be used to split the ON laser beam to a number of encoders, allowing the use of sub-bands for tuning. For example, the wavelength used may vary by 50-100 nm.

In some embodiments, different wavelengths are used for different beams, which are emitted in different spatial directions. In these embodiments, the radiation direction of the emitters can be tuned by wavelength; this capability can be designed into the system. For example, a 20° change in spatial direction may correspond to a 100 nm wavelength change. In some embodiments, a "scanner" or "optical scanner" can be defined as a device which generates one or more optical beams and is capable of adaptively scanning and/or beamforming.

In some embodiments, each encoder is connected to a scanner, such as a 2D scanner, which can orient the beam into different directions. In some embodiments, the 2D scanners are fabricated on a monolithic chip. Each 2D scanner can orient a beam in a specific direction in space, for a given setting and/or wavelength, and steer the beam by a certain amount, by changing its settings and/or wavelength. Therefore, each scanner can orient the beam at a specific $\theta$ and $\varphi$. As understood by the person of ordinary skill in the art, $\theta$ and $\varphi$ are spherical coordinates angles. For example, $\theta$ may be defined as the angle between the emitted beam and the axis normal to the plane of the photonic chip onto which the scanner is fabricated, while $\varphi$ may be defined as the angle between the emitted beam and an axis perpendicular to the axis normal to the plane of the photonic chip, for example the longitudinal axis of the chip. Different frames of reference may be used through a simple coordinate transformation. Different LiDAR systems can cover different angles in space. Multiple systems may be used together to cover a larger set of angles. For example, if a system can cover 120° horizontally, three such systems may cover 360°. The two emission angles, θ and φ, can be used to parametrize the emission space. In some embodiments, 1D scanners can be used instead of 2D scanners, to steer the beam in one direction (for example φ) and multiple 1D scanners can be used to orient the beam in the other direction, (e.g. θ), to cover specific angular ranges. Examples of emitters that can be used in a 1D scanner are etched facet Si waveguides, grating couplers, or plasmonic radiators.

In some embodiments, the θ angle at which the beam is emitted can be controlled by the engineering of the emitters (e.g. gratings) in the phased array and can be swept by changing the wavelength input to the phased array. The φ angle at which the beam is emitted can be controlled by the orientation of the phased array and can be swept by controlling (e.g. by a CMOS electronic circuitry) the phase or amplitude of the emitters. Different phased array may also be arranged with different orientations relative to each other. By engineering and electronic control, the scanning arcs of the LiDAR are therefore configurable in design and customizable in use.

Encoding advantageously increases the capacity (the number of processed points in the space per second) of the LiDAR system, as instead of sending single laser pulses, multiple pulses can be emitted in a short period of time, each with a different code. The codes can be designed so that the receiver is able to reconstruct and decode the received laser pulses.

Different applications for LiDAR systems may have different requirements in the angles of coverage. Such requirements may be fulfilled in different ways. In some embodiments, 1D scanners may be used to create multiple beams in the horizontal plane. In other embodiments, 2D scanners can use multiple beams by varying θ and φ, thus allowing coverage in the horizontal and vertical directions. In some embodiments, the receiver may use multiple orthogonal receivers to detect multiple beams emitted by the plurality of scanners. Therefore, in some embodiments a phased array may be implemented at the transmitter only, at the receiver only, or at both transmitter and receiver.

In an optical phased array, multiple emitters are placed close together, typically with uniform or non-uniform spacing. By changing the phase and amplitude of each emitter independently, the generated far field beam can be steered, and its shape can be formed arbitrarily, electronically, without moving any parts physically. The tuning mechanism of the optical phase or amplitude can be carried out, for example, by using electro-optical effects such as carrier injection/depletion inside Si PIN diodes, thermo-optical effects, and electro-absorption effect (e.g. Franz-Keldysh effect) inside materials such as SiGe or Ge. The tuning electrical signal can be provided, for example, through the complementary metal-oxide-semiconductor (CMOS) circuitry. The optical phased arrays in the present disclosure can therefore achieve beam steering, beam forming and spatial selectivity through electronic control, instead of mechanically moving the emitters. In phased arrays, the antenna pitch is desired to be sub-wavelength to allow a wide steering range, otherwise identical images (grating lobes) are created in the far field, causing power efficiency degradation while at the same time limiting the range that the beam can be steered in. The distance between emitters can be controlled during fabrication. Reducing the spacing between emitters can reduce the radiation efficiency of the array, or cause a power leak from one emitter to the adjacent one. For example, Si waveguides with sub-micron thickness on the same substrate placed with a center to center spacing less than 1.5-2 µm apart can cause a power leak between adjacent emitters. As a consequence of these current technological constraints, the steering range can be limited to around 50°. In the present disclosure, the steering range can be higher than 50° since the emitters can be fabricated using thicker Si, and the highly confined optical mode inside the waveguides allows shrinking the emitter pitch without causing a power leak to adjacent emitters.

In some embodiments, the photonic components are all fabricated monolithically in a single chip, while the control circuitry, e.g. CMOS circuitry, is fabricated in a separate chip. The separation between chips allows the optimization of the photonics on custom silicon photonic processes (e.g. Si), as well as a separate, independent, optimization of the electronic circuitries in the CMOS chip. The monolithic fabrication of both parts in a single chip is possible but can lead to a compromise in performance that can limit the overall performance of the LiDAR system. For instance, monolithic processes do not support thick (micron level) Si waveguides, while micron-sized waveguides can guide and radiate high optical power (e.g. Watt level required for ranging of about 200 meters for self-driving cars application). In future, as CMOS and photonics fabrication techniques become more advanced, the entire system may be fabricated monolithically.

In some embodiments, the different components are fabricated on a Si chip that has a varying thickness. For example, the thickness may be larger at the laser input and switch side, and gradually or abruptly decrease towards the splitter, the encoder and the scanner. For example, a thickness of 3 or more micrometers may be used to vertically confine the optical mode in the waveguide in early stages of the system (e.g. on the laser input side), to increase the optical power handling of the system. In some embodiments, the number of emitters inside a scanner can be in the hundreds or thousands. Therefore, the input optical power is order(s) of magnitude higher than the power of each emitter. The thickness of Si on the scanner side is typically a few microns. Micron level thickness allows strong vertical confinement. In other words, most of the optical power is confined in the middle of the waveguide and the amount of power leaked into the cladding (typically $SiO_2$) is much less than the case where the Si waveguide thickness is sub-micron. The thickness gradient helps reducing the emitter pitch without causing performance degradation, while at the same time allowing an increase in the steering range. Another advantage of using micron level waveguides is the low sensitivity of the optical phase of emitted beams to the fabrication process tolerances, waveguide sidewall roughness, width tolerance and thickness variations from one point to another point of the waveguide optical circuit. The size of the photonic circuitry typically is in the millimeter order of magnitude, therefore it is advantageous to keep unwanted optical phase variations as low as possible. The order of magnitude for the change in refractive index of Si due to variations in the fabrication process in sub-micron silicon photonic processes is $10^{-4}$, while in micron-level fabrication processes it can be two orders of magnitude lower (e.g. $10^{-6}$). The sub-wavelength horizontal spacing between emitters, for example below 1 micrometer (e.g. 0.7-0.8 micrometers) for a wavelength equal to 1.55 µm, allows a wide steering range (e.g. more than 140°) that is significantly larger than the current state of the art values of 50°.

Different LiDAR systems as described herein may have a different number of scanners or antennas, depending on the application. Different scanning speeds may also be implemented. An exemplary scanning speed could be $10^6$ points per second. For example, self-driving vehicles may require a high scanning speed, while other applications may require a high resolution, but be tolerant of lower scanning speeds. The LiDAR system may also be configured to automatically or manually switch to a low power operation state, where some of the scanners are turned off or laser power is controlled. For example, the system may normally operate multiple (M) scanners, but in certain situations it may turn part of the scanners OFF, or even simply operate with only one scanner. The system may then turn ON additional scanners as required.

Different applications may have different requirements for the phased array. The beam generated by a phased array often includes side lobes and a main lobe. For some applications, such as self-driving cars, the peak-to-peak ratio of main to side lobes may be required to be 40-50 dB. This requirement can originate because of the reflection from bright surfaces such as traffic signs. The reflection, in these cases, can cause saturation of the main lobe signal, compared to the side-lobe peak power. On the other hand, dark objects have much lower reflectivity compared to bright objects. The variation in reflectivity from objects commonly found in a driving environment may require that the receiver is able to handle a dynamic range of around 100 dB. This requirement may be met by a combination of active beam forming and a high dynamic range at the receiver.

The optical phased array of the present disclosure allows independent control of the phase and amplitude of each emitter inside each scanner, thus allowing beam forming. Independent control of phase shift and amplitude of optical field at each element enables creation of arbitrary radiation patterns. The wavelength band of electromagnetic waves used, e.g. 1500-1600 nm, allows the implementation of a small size for each unit element and a reduction in unwanted grating lobes in the far-field radiation pattern. As known to the person of ordinary skill in the art, phased arrays as described in the present disclosure can be implemented with radiating elements comprising a grating coupler, etched facet waveguides, or mirrored facet waveguide. The optical phased array can radiate light with desired patterns when implemented in a transmitter system. The optical phased array can also receive the light incident to the array at the desired directions, when implemented as a receiver system.

The 3D imaging systems of the present disclosure may differ in their specification according to their application. For example, for autonomous vehicles, the imaging system may have a range of some hundreds meters, a power consumption of tens of Watts, the radiated peak power may be in the tens of Watts, the size of the system may be about 10×10 cm$^2$, the angular resolution may be less than 0.1°, the horizontal or vertical field of view (FOV) may be 100°×20°, For example, for consumer electronics the range may be limited to less than 5 meters, the power consumption may be less than 2 W, the radiated peak power may be less than 10 mW, the size of the system may have high constraints, for example being less than 1 cm$^2$ (e.g. a single stage laser may be sufficient), the angular resolution may be less than 0.2°, the horizontal or vertical field of view may be 80°×80° or greater, e.g. 100°×100°. In some embodiments, the FOV of consumer devices is square.

FIG. 1 illustrates an exemplary transmitter according to an embodiment of the present disclosure. A number of lasers with tunable wavelengths (110), numbered from 1 to K, are driven by an electronic circuit, e.g. a CMOS chip (105). The wavelength range for each laser is indicated as $\lambda_1$-$\lambda_2$ up to $\lambda_m$-$\lambda_n$. The laser is followed by a K×1 optical switch that can be based, for example, on cascaded MZI interferometers with active phase tuners (115), also controlled by an electronic circuit (e.g. a CMOS chip) (125). The laser beams then enter a 1×m splitter (120), where m is the number of scanners. Each scanner (150) includes a phased array architecture. All the optical components (e.g. not including the electronic circuitries) can be fabricated on a single die with or without laser, while the rest of the circuitry can be fabricated separately and then bonded or attached to the optical component die. The light can be guided using waveguides, e.g. made of Si. In some embodiments, the Si waveguide has a thickness gradient decreasing towards the output direction, i.e. the direction of the scanners. The thickness gradient is possible from fabrication standing point and it is important because earlier stages of the system, i.e. before the splitters, may require high optical power, while each emitter inside each scanner is radiating a fraction of the total input power, and therefore does not require high optical power handling. On the other hand, using smaller waveguides on the scanner side of the system reduces the active power consumption required to tune each scanner and also enables designing emitters with higher radiation efficiencies. Therefore, in some embodiments, the waveguides have a thickness gradient, with a thicker thickness before a splitter, and a lower thickness after the splitter. In other embodiments, the thickness of the Si may be increased, instead, if required by the specific application. In some embodiments, thickness tapering can be used to transition between high and low power elements, as a lower power can be transmitted by waveguides with a decreased thickness. In some embodiments, the Si thickness, although varying, is maintained at 1 micrometer or higher. For example, the phase error of waveguides that are at least 3 micrometers thick is 2 orders of magnitude lower than that of waveguides having a sub-micrometer thickness. The specific application may benefit from sub-micrometer or above-micrometer thicknesses. In some embodiments, by keeping the thickness at one micrometer or higher, the fabrication and integration of a great number of components in a single chip can be advantageously simplified, and result in high yield and better performance.

Subsequently, m encoders (135,140) can encode the laser signals to enable spatial selectivity. For example, the signals may be encoded in the time or frequency domains to support either time-of-flight or frequency modulated continuous wave imaging architectures. The laser optical path then continues past the encoders into the scanners. In the example of FIG. 1, the scanners are 2D scanners (150,155) which can each encode in a different spatial direction determined by two parameters. Each 2D scanner is fabricated on the same chip to emit in a fixed direction, for a given wavelength and setting of amplitude and/or phases of the active components within the scanner. The output beam generated by each scanner can be steered in different directions by tuning the phase and/or amplitude of the emitters inside each scanner and wavelength. In the example of FIG. 1, the two parameters controlled by the 2D scanners are the angles θ and φ (145). The system of FIG. 1 can also vary other parameters as discussed above, such as the wavelength, the wavelength bands for each laser, what lasers are switched ON or OFF at any given time, as well as encoding different signal patterns for each 2D scanner. By controlling different parameters, the operational capability of the LiDAR system greatly improves. In FIG. 1, the modulated beam (160) is illustrated for three exemplary scanners, though any number of scanners may be incorporated in an array. In some embodiments, the switch, splitter, encoder and 2D scanners are all fabricated monolithically in one Si chip, while the CMOS circuitry (125) is fabricated on a different chip, and the two chips are packaged together. The CMOS circuitry (125) also controls the encoders (135,140), switch (115) and can also control the 2D scanners (155). The CMOS circuitry can also sync with the receiver (130) to enhance signal collection, using electronic control signals.

The lasers (110) can comprise multiple tunable lasers. Some of the parameters of the LiDAR system comprise the wavelength, the time domain, the encoding, and the spatial orientation of the beam. Controlling different parameters allow the LiDAR system to minimize jamming (unwanted interference) from other LiDAR systems. For example, encoding can reduce interference during operation if other LiDAR systems are operating concurrently in the same environment, as expected in certain applications such as self-driving cars.

In some embodiments, a fixed wavelength and one scanner can be used to steer the beam in one direction by controlling φ. In these embodiments, multiple 1D scanners, fabricated in different chips, can be used to steer the beam by controlling θ; these 1D scanners are designed as oriented at different θ within the same package.

In some embodiments, the K×1 optical switch (115) can be substituted with an optical multiplexer (MUX). As understood by the person of ordinary skill in the art, the optical switch, being an active component, consumes electrical power to operate, while the optical multiplexer, being a passive component, does not consume electrical power. On the other hand, using an active switch gives the flexibility to choose different wavelengths as required to adaptively control the number of sampling per second. For example, an active switch can quickly switch between the beams of different lasers, at different wavelengths, thus illuminating the same point with multiple wavelengths.

Figure 2:
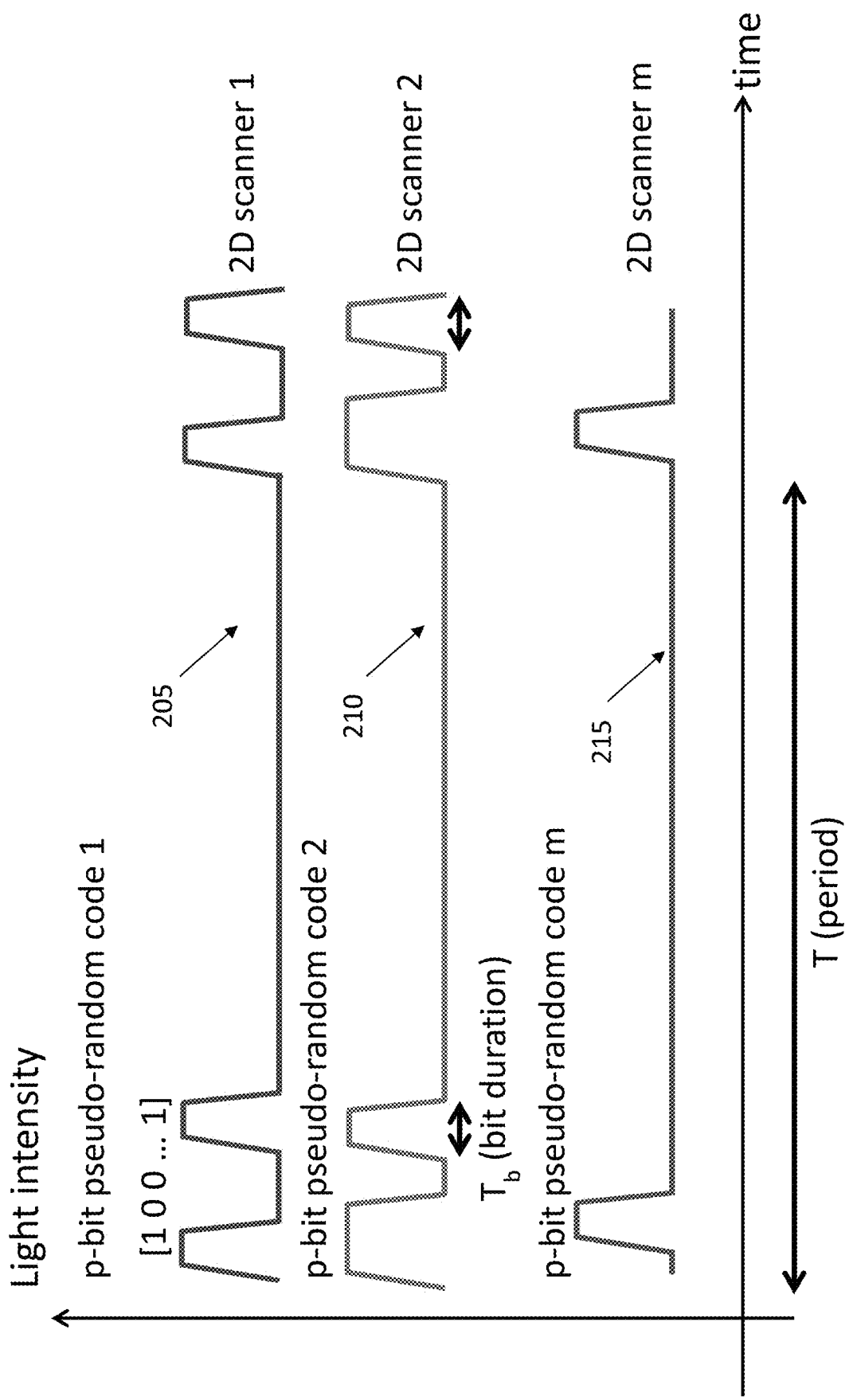
FIG. 2 illustrates an exemplary coding scheme.

FIG. 2 illustrates an exemplary coding scheme for some of the encoders of FIG. 1. For example, three different encoding schemes for three different scanners are illustrated (205,210,215). The light intensity on the y axis is plotted against time on the x axis. In some embodiments, a digital code with high and low states can be used. The code can be pseudo-random to create orthogonality between codes, and minimize interference at the receiver. Each scanner may operate with a code having different pulse schemes. For example, the number, sequence and duration of the pulses can be modulated. In the example of FIG. 2, each pulse has a small ramp up and down, with shapes similar to a square wave. In some embodiments, the code used is digital, with each binary digit being a square wave pulse of equal duration, e.g. each 1 being a square pulse of equal duration and amplitude. In the example (205), the 4-bit code word [1 0 0 1] is implemented by time-domain waveform and includes four pulses with high, low, low and high values, each with duration $T_b$. In the example (210), the 4-bit code word is [1 1 0 1], and in the example (215) it is [0 1 0 0]. The code words can be repeated with a period of T. The person of ordinary skill in the art will understand that different digital coding schemes can be applied. Once the encoded signal is transmitted, the range to the object can be determined by measuring the time that it takes for the pulse to be detected at the receiver (the time between transmission at the transmitter, and reception at the receiver after reflection from the environment).

Figure 3:
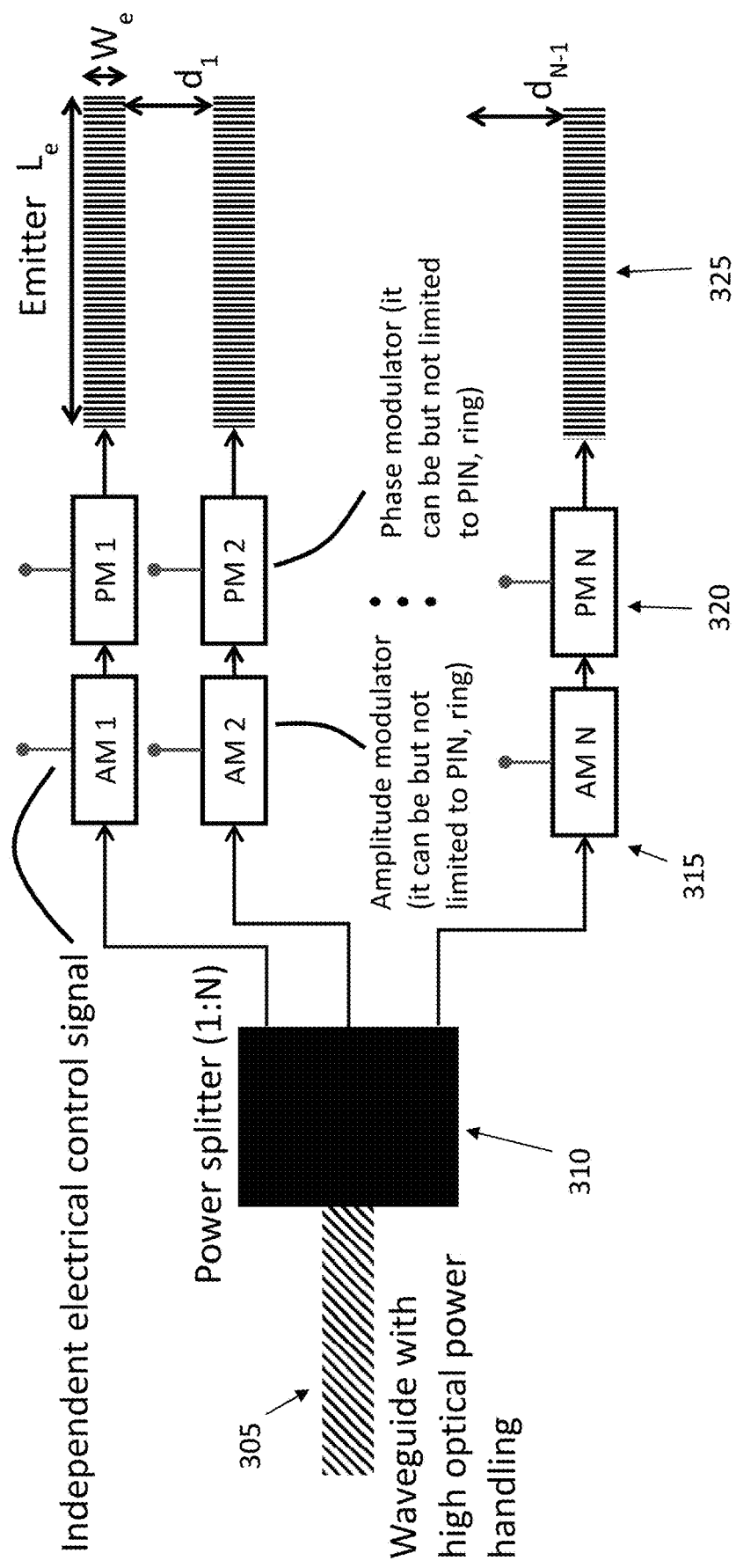
FIG. 3 illustrates an exemplary 2D scanner.

FIG. 3 illustrates an exemplary 2D scanner. The system of FIG. 1, in some embodiments, can comprise multiple scanners (150). In some embodiments, each scanner (150) can comprise the components of FIG. 3. In some embodiments, the spacing between emitters is uniform, however in other embodiments, a non-uniform spacing can render the far field beam more focused. In these embodiments, the non-uniform spacing between emitters narrows the beam width and increase the beam directivity.

The angular range covered in the present disclosure architecture is reconfigurable, and by design can typically cover more than 120° horizontally and more than 80° vertically. For applications that require very wide angular ranges, such as 360° horizontal ranges in self-driving cars, multiple LiDAR systems can be used.

FIG. 3 illustrates an exemplary scanner. Multiple scanners may be used in a single system. Each scanner, therefore, may comprise a power splitter to divide the optical mode across multiple emitters. The split ratio at the power splitter can be non-uniform to save power consumption and carry out passive beamforming. In FIG. 3, the waveguide (305) has a thickness that allows high optical power handling. For example, the cross section may be sized accordingly, and/or PIN junctions may be used to sweep up free carriers released due to high optical power to keep the propagation loss as low as possible, hence increasing the optical power handling. As known to the person of ordinary skill in the art, a PIN junction comprises an intrinsic or undoped layer sandwiched between a p- and an n-doped region. In some embodiments, tens of W may pass through the waveguide. For example, 60-80 W may be required for ranging at distances greater than 200 m, which may be acceptable for cars and other vehicles such as helicopters or drones may require longer ranges. In some embodiments, a thickness of 3 micrometers or higher may be used, such as 10-20 micrometers. For example, a Si thickness of 3 micrometers for the waveguides may be sufficient for a radiated peak power of 30-50 W, while km ranging may require higher thicknesses.

The splitter (310) distributes the laser optical power to different channels, successively through amplitude modulators (315), phase modulators (320) and to the emitters (325). The amplitude and phase modulators may comprise PIN junctions, ring resonators, thermo-optical devices, electro-absorption modulators based on Franz-Keldysh, or quantum confined Stark effect (QCSE), etc. The emitters fabrication parameters may comprise an individual length $L_e$, a width $W_e$, and a spacing d between emitters. The spacing may be uniform or vary between emitters. In some embodiments, a calibration photodiode can be connected past each emitter, for calibration purposes. In some embodiments, each emitter, by design, has a residual power at its end that can be fed to an on-chip or off-chip photodetector. The photodetector can be, for example, made of Ge and integrated in the same fabrication process, or a III-V semiconductor which is heterogeneously integrated. In some embodiments, 1-5% of input power to the emitter is left at the end of the emitters to be detected by photodiodes, to calibrate the amplitude response of each emitter as well as the loss in transmission from the laser to each emitter. Therefore, in some embodiments, the system can continuously monitor and calibrate the amplitude response of each emitter.

In some embodiments, the signal output by the LiDAR system may have side lobes which can create confusion in the 3D imaging if one of the objects in the system's environment has a reflected signal that falls in amplitude within the same range of one of the side lobes. One way to solve this problem is to increase the peak to peak ratio for the main and side lobe peaks, by doing beamforming. Beamforming can be carried out using the amplitude controllers of the phased array, such as, for example, the AM modules (520) in FIG. 5. For example, by implementing a Gaussian amplitude profile it is possible to achieve a 20-25 dB improvement in the peak to peak ratio for the main to side lobe peaks, compared with a uniform amplitude profile. With a Gaussian profile, some emitters would receive a lower amplitude compared to other emitters, with an amplitude variation determined by the Gauss function. For example, central emitters would receive a higher amplitude than non-central emitters. By controlling the amplitude profile (e.g. uniform, Gaussian, etc.) of the light transmitted through each emitter, it is possible to control the spot size emitted by the LiDAR system.

The amplitude and phase modulators and the emitters may be collectively termed as the phased array. The Si thickness may gradually decrease from the splitter to the emitter by a vertical taper. For example, if the Si thickness is 3 micrometers at the splitter side, the emitters may have a Si thickness of about 1 micrometer, with the spacing d also being about sub 1 micrometer. Since the laser power is split between emitters, the waveguides past the emitters can have a reduced thickness since high power handling is not required in the terminal elements. In some embodiments, the spacing between emitters and/or the width of each emitter is chosen to have sub-wavelength values. Since multiple beams could confuse reception at the receiver, the phased array can apply beam forming, as known to the person of ordinary skill in the art. In some embodiments, 100 emitters or more may be fabricated for each phased array to create a fine angular resolution, of the order of 0.1°.

In some applications, a 10% reflectivity from objects in the environment at a 200 m range is considered acceptable, and the LiDAR system can be configured to allow detection of the reflected signals with a reflectivity of 10% at 200 m.

Figure 4:
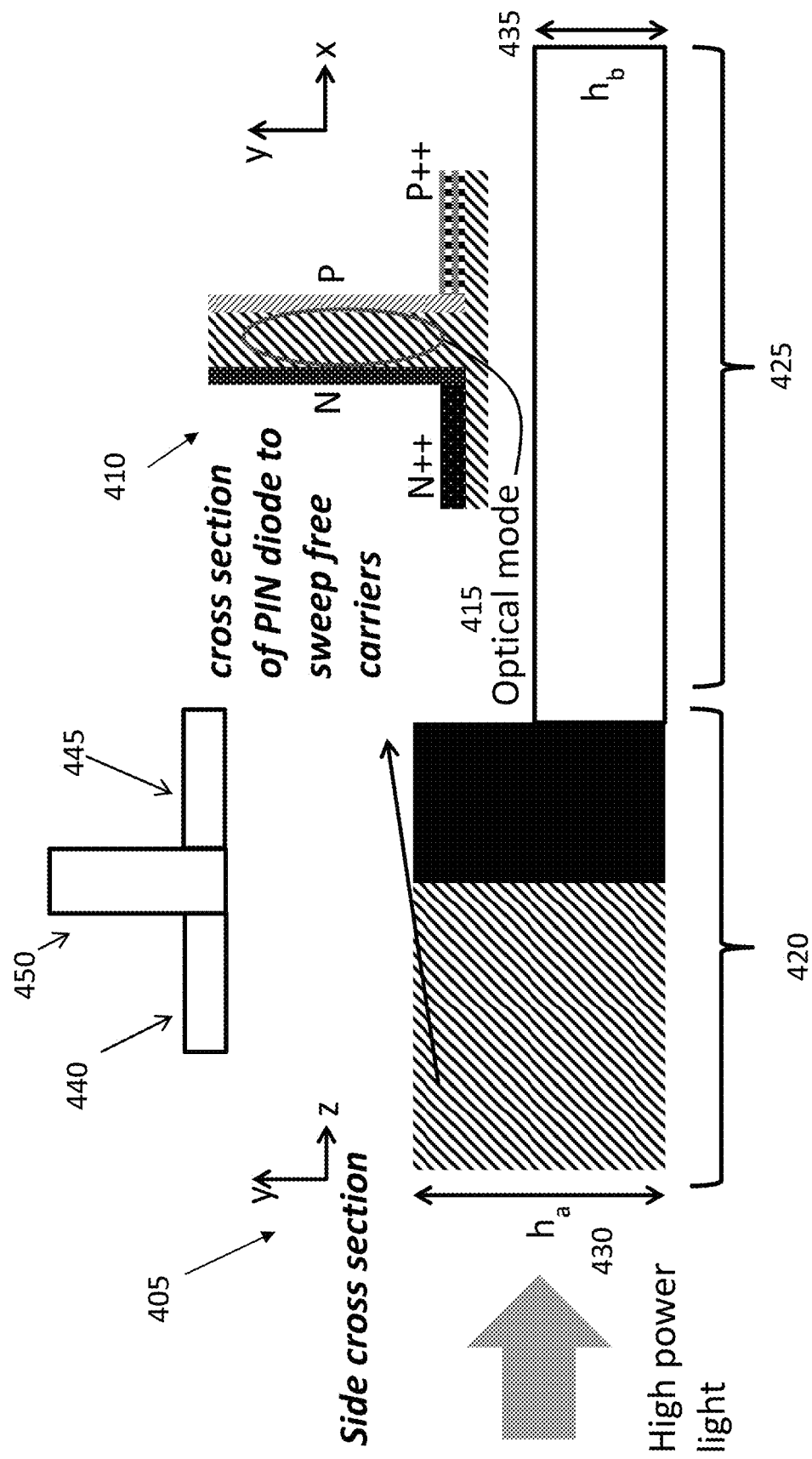
FIG. 4 illustrates some techniques to increase the power handling of the LiDAR system.

FIG. 4 illustrates some techniques to increase the power handling of the LiDAR system. A cross section in the yz plane (405) and a cross section in the yx plane (410) are shown. The optical mode (415) in the PIN diode (410) is also illustrated. The power handling can be increased by increasing the silicon waveguide thickness, and/or using a PIN diode across the waveguide to sweep free carriers. In some embodiments, the $h_a$ (430) dimension in FIG. 4 is in the range of 2-10 μm, while the range for $h_b$ (435) can be 0.5-2 μm. In FIG. 4, section (420) represents the input waveguide all the way to after the splitter, where the level of power is at least one order of magnitude less than the input power, while section (425) represents the lower power photonic circuitry, such as emitters and associated amplitude and phase controllers. In some embodiments, the diode may comprise an n++ region (440), and a p++ region (445), with no doping requirements for the central region or the sidewalls of the waveguide (450), which can be left as intrinsic. This embodiment may have better power efficiency, as the n and p regions do not need to extend onto the central region (450). The modulators (320) of FIG. 3 point the beam in the desired direction. In some embodiments, the encoders of FIG. 1 can be substituted with modulators, changing the operation to continuous wave mode instead of pulsed mode. In some embodiments, the amplitude may be kept constant, and only the frequency is modulated over time. For example, chirping can be carried out, and the lasers are turned ON one at a time. In some embodiments, a single modulator may be used, and shared by all lasers. In other embodiments, the number of modulators used instead of the encoders can be equal to the number of scanners or optical phased arrays. If multiple modulators are used, each modulator can modulate a different beam in a different manner, which can be advantageous. However, the tradeoff is that a higher number of components is required, therefore increasing power consumption.

Figure 5:
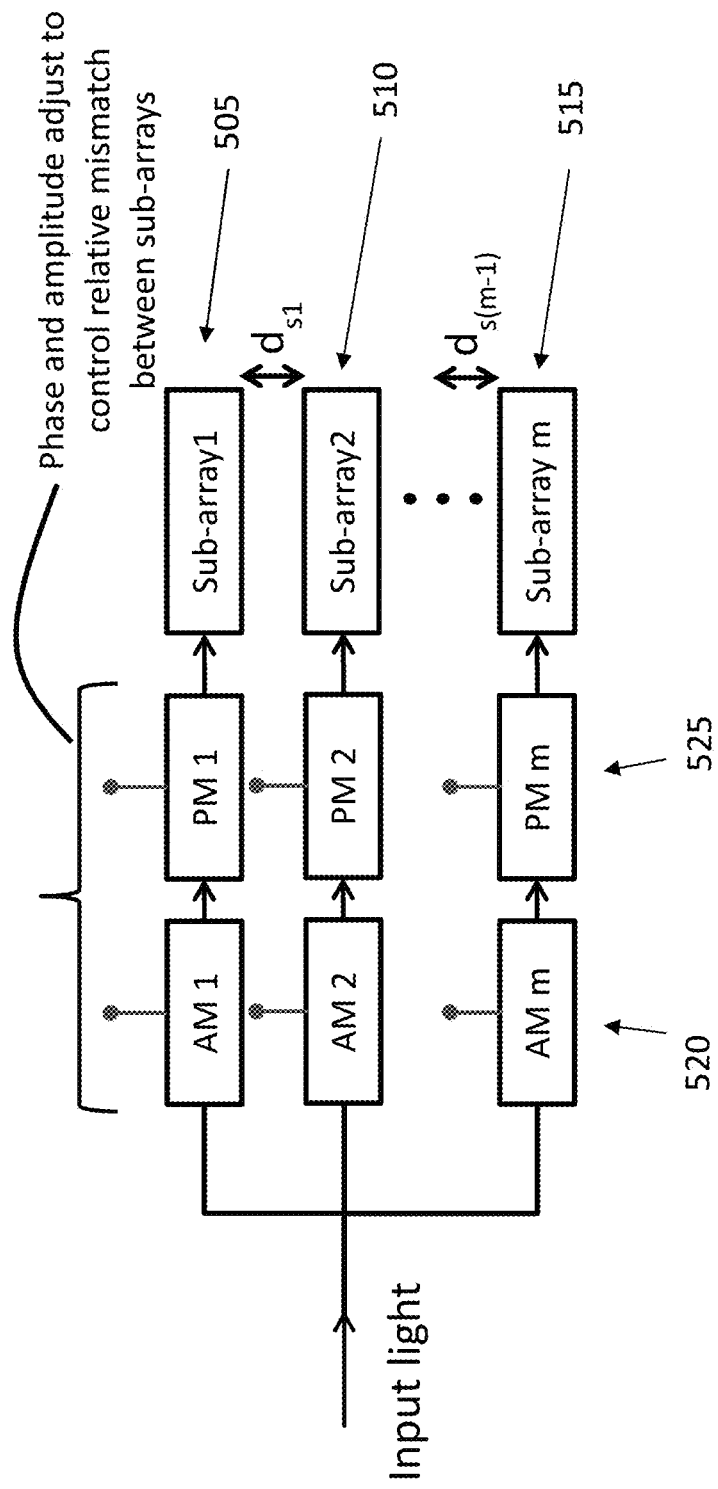
FIG. 5 illustrates an exemplary clustered architecture for a scanner.

FIG. 5 illustrates an exemplary clustered architecture for a scanner. In FIG. 5, each subarray (505,510,515) consists of a scanner as described, for example, in FIG. 3. The amplitude (520) and phase (525) modulators can adjust and control the relative mismatch between subarrays. A different spacing d may separate different subarrays. The number of emitters and spacing can be different from one sub-array to another one, to optimize beamwidth and shape of the far field pattern.

The emitters of the scanners described above can be fabricated in different ways. For example, a grating coupler may be used. As known to the person of ordinary skill in the art, a grating coupler typically comprises a grating above or below a waveguide. Depending on the resonance between the waveguide and the grating, certain optical modes can be coupled between the two structures. In other embodiments, other types of emitter may be used, such as etched facet Si waveguide, metal mirrors, etc. In some embodiments, the emitters used in the present disclosure have a wavelength dependent dispersion, causing steering of the beam in one direction, wide far field beam width in a first direction, and narrow beam width in a second direction perpendicular to the first direction.

Figure 6:
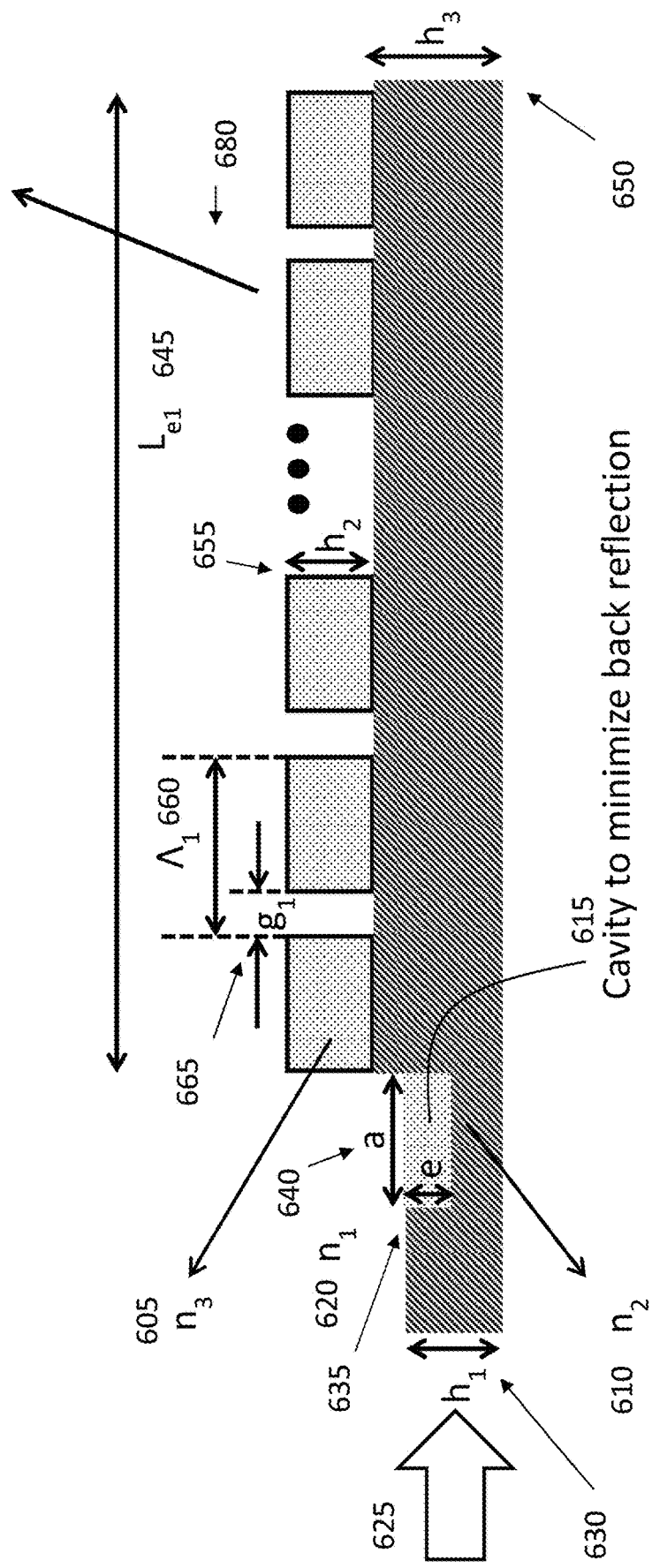
FIG. 6 illustrates an exemplary grating geometry for the emitters.

FIG. 6 illustrates an exemplary grating geometry for the emitters, in a side view. The laser light is in the plane of the figure, from left to right (625). Several geometric and material parameters can be specified, such as the height h1 for the material thickness (630), $h_2$ for the thickness of the beams forming the grating (655) and h3 for the material thickness at the final end of the emitter (650). In FIG. 6, the refractive indexes of different parts of the structure are indicated as $n_1$ (620), $n_2$ (610) and $n_3$ (605). In some embodiments, (610) and (605) are made of Si, or SiN, while the cladding (620) and the cavity (615) are made of $SiO_2$. The cavity (615) can minimize back reflections and improve upward radiation efficiency. The height and length of cavity (615) are indicated as e (635) and a (640). Other geometrical parameters comprise the separation between teeth (beams making up the grating), gi (665), the period of the grating $\Lambda_1$ (660), and the total length of the grating $L_{e1}$ (645).

The grating geometry, by design, can be tuned for each 2D scanner so that for a given wavelength the scanner radiates in a different radiation angle θ. The emitter geometry and design can be tuned to optimize upward radiation efficiency for different θ. In FIG. 6, an exemplary direction of the radiated light is shown (680).

Figure 7:
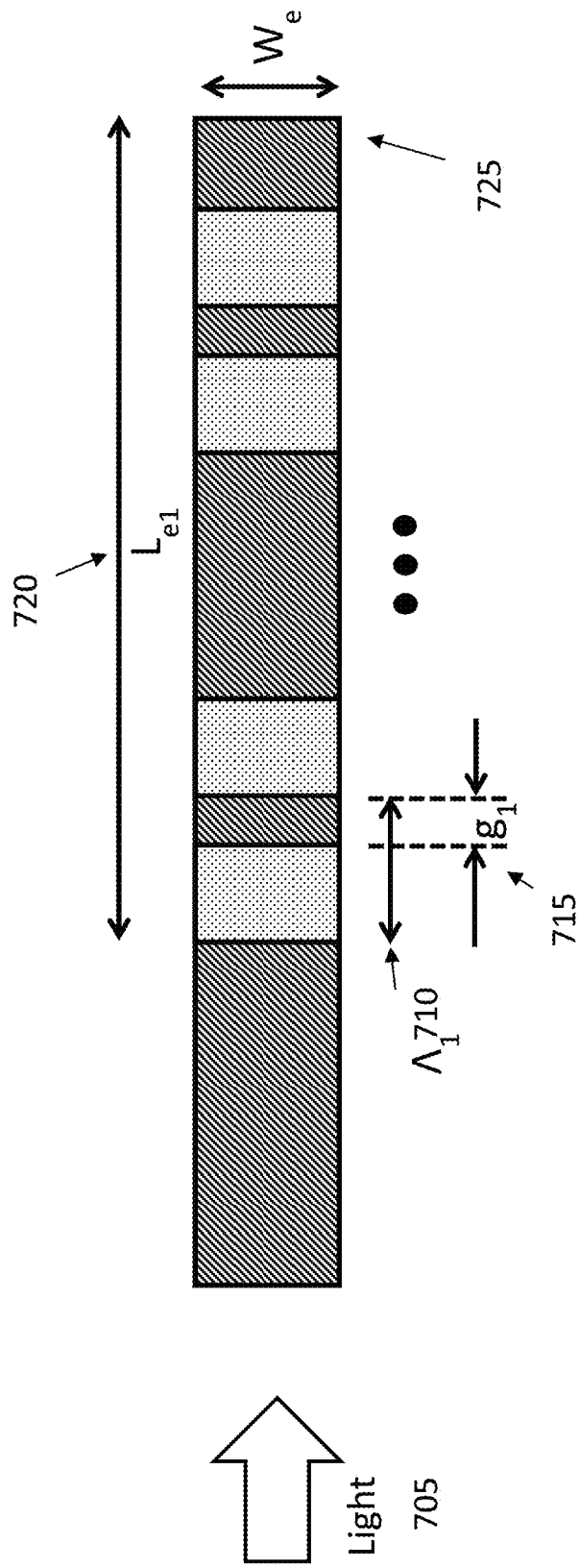
FIG. 7 illustrates a top view of an example emitter.

FIG. 7 illustrates a top view of an emitter. For example, FIG. 7 represents a top view of part of FIG. 6. The laser light (705) enters the structure as in FIG. 6. Parameters (715,710, 720) are defined as in FIG. 6. The width $W_e$ (725) of the grating is shown in FIG. 7. The grating width can be designed to be typically sub-wavelength in size to shrink the antenna pitch size in the optical phased array. For example, the width of the grating can be sub micrometer, e.g. a 0.5 μm width will generate far field beamwidth of approximately 150°. In FIG. 7, an exemplary radiation direction is out of the sheet of the figure.

Figure 8:
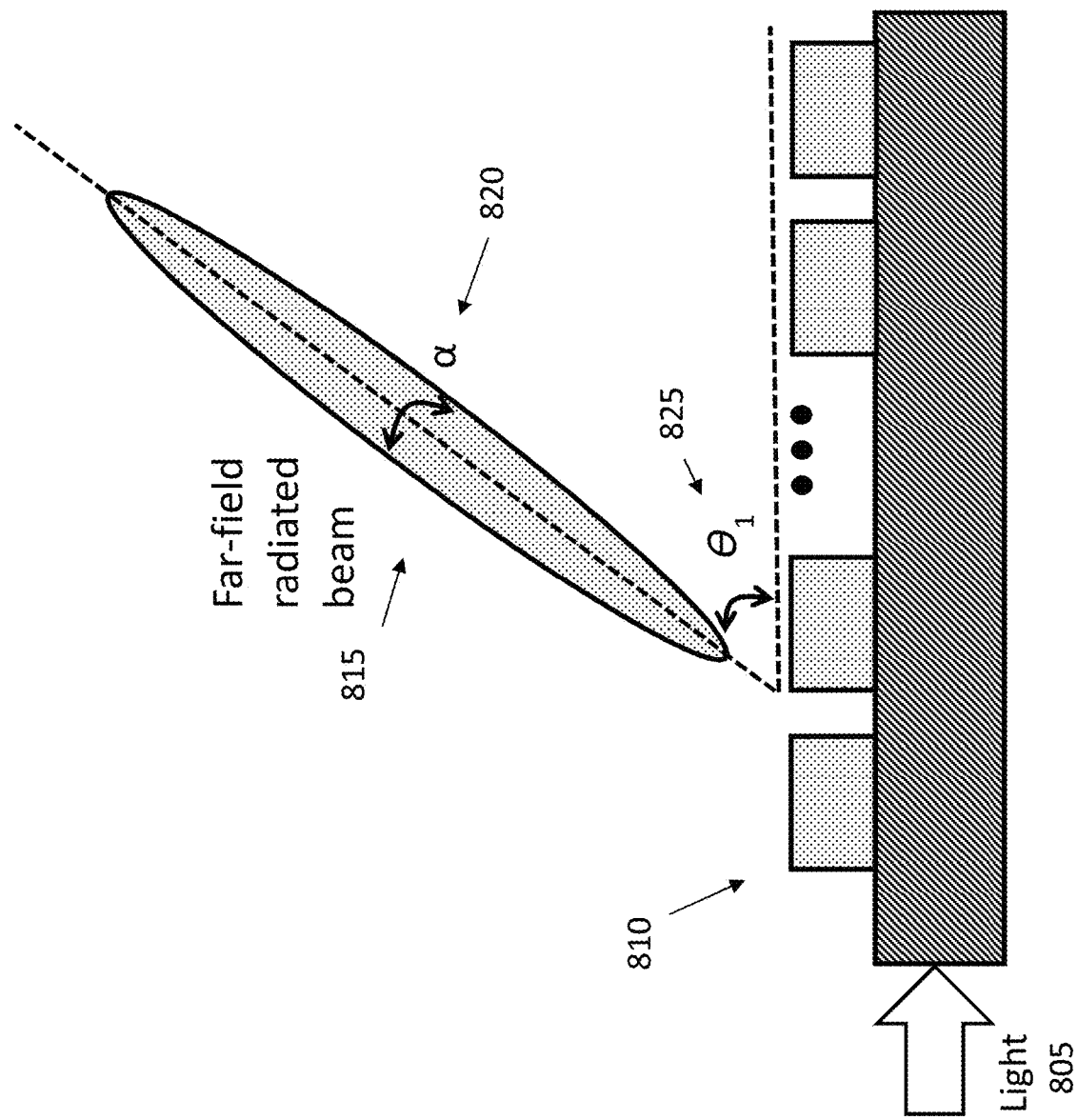
FIG. 8 illustrates an exemplary grating beam emitter.

FIG. 8 illustrates an exemplary beam emitted by a grating. In FIG. 8, the laser light is guided into the grating in direction (805). As in previous figures, only part of the grating (810) is shown, as the grating may comprise a significantly greater number of beams than shown in the figures of the present application, as understood by the person of ordinary skill in the art. In some embodiments, different emitters, by design, may have different radiation angles. An exemplary far-field radiated beam is shown (815), emitted at an angle $\theta_1$ (825). The beam size can be described as angle $\alpha$ (820) and can be designed to be narrow, depending on the specific emitter design. In some embodiments, a is typically less than 0.1° for an emitter having a length $L_{e1}$ (720) of a few hundred micrometers, as it may be required by some applications such as self-driving cars. This beam size has weak wavelength dependency. For example, for 100 nm wavelength change from 1500-1600 nm, beamwidth may change by around 6%. As known to the person of ordinary skill in the art, the beamwidth of a far field beam of a phased array in angular direction along emitters line-up, is roughly inversely proportional to the number of antennas. In some embodiments, hundreds of antennas may be needed to achieve a 0.1° resolution, e.g. at least 100 antennas may be required. Similar to a there is also a weak wavelength dependency on the beamwidth size along phased array. For a 100 nm wavelength change from 1500-1600 nm, the beamwidth may change by around 6%.

The tolerance of the absolute beam angular direction in $\theta$ is a function of error in wavelength and process tolerance on emitter fabrication. For typical device parameters, the tolerance is about 0.1% of the beamsize (it is therefore negligible). In the $\varphi$ direction (phased array) it is a function of phase, and amplitude settings and process tolerance. Analysis shows it is around 1% of the beamsize. This tolerance can be calibrated out using look-up tables for phase and amplitude settings. Unwanted change in the characteristics of the beam profile for different points within field of view due to process variation, wavelength drift, etc. can be calibrated and set to meet required performance parameters of a LiDAR system like angular resolution, based on application, by adjusting parameters in the disclosed architecture. In other words, the continuous calibration allows the detection and adjustment of unwanted changes in the emission.

Figure 9:
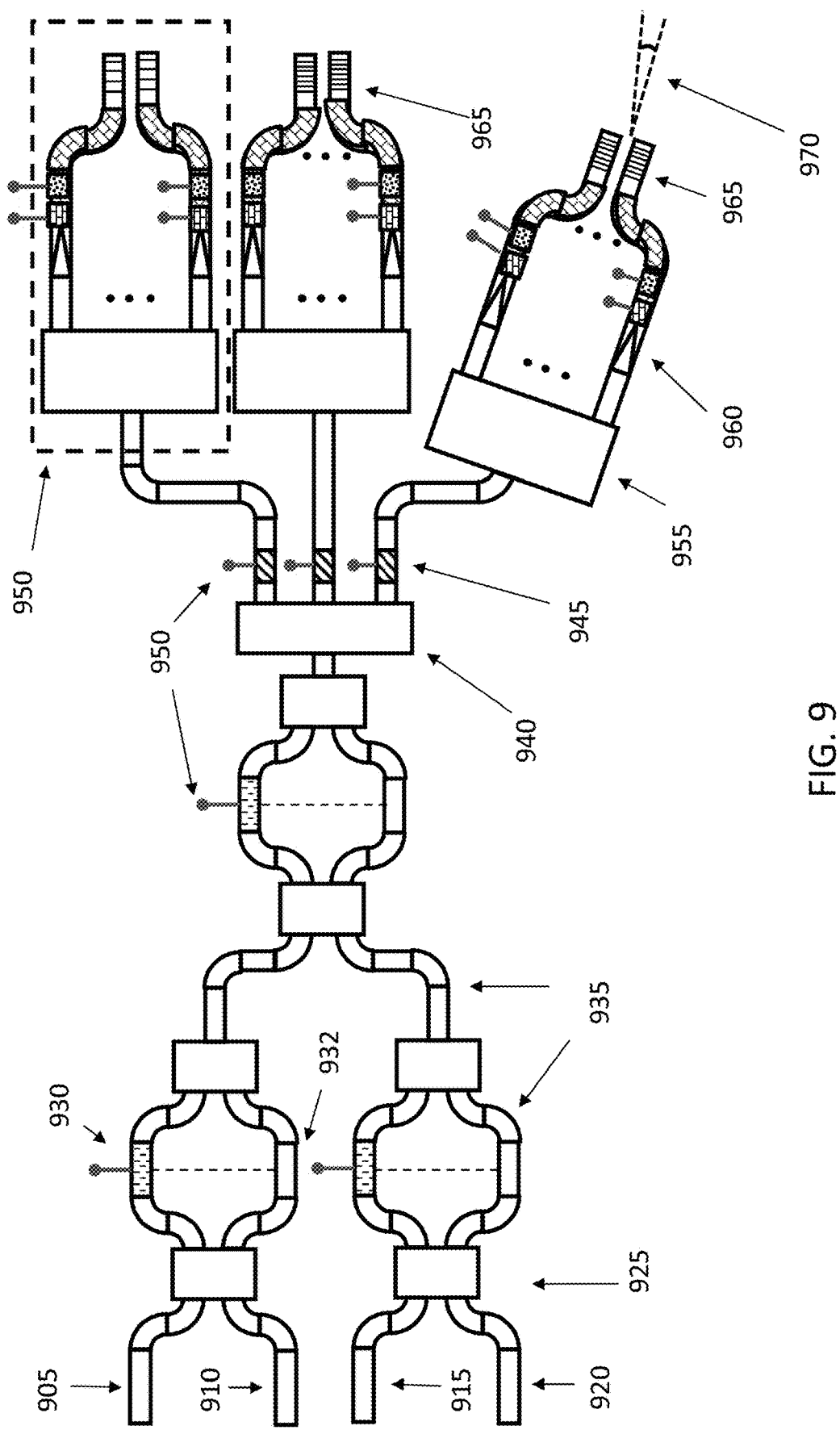
FIG. 9 illustrates an exemplary layout of 2D scanners to increase the field of view of the LiDAR system.

FIG. 9 illustrates an exemplary layout of 2D scanners to increase the field of view of the LiDAR system. In this example, four lasers are coupled into four Si waveguides (905,910,915,920) and operate at four different wavelength bands. Waveguides connect the lasers to two 2×1 switches. Each 2×1 switch comprises a 2×2 power splitter (925), such as a multi-mode interferometer, followed by two balanced waveguides, one or both having an electro-optical phase modulator, such as a PIN diode or a thermo-optical devices, to switch one of the inputs to the output waveguide. In some embodiments, depending on the voltage across each phase modulator, only one input is connected to the output simultaneously. The 2×1 switch can therefore comprise a 2×2 splitter, a phase modulator and a 2×1 splitter. In some embodiments, different voltage settings can be used to transmit a portion of both inputs to the output depending on the relative phase difference between arms of switch. Several waveguides (935) are illustrated, as understood by the person of ordinary skill in the art. In some embodiments, the thickness of the Si is tapered across the structure, decreasing from the lasers and switches towards the emitters. In some embodiments, the thickness is kept no lower than a micrometer to keep the phase error between waveguides under control and being able to increase the number of components in a small chip, to improve performance parameters such as the angular resolution of the LiDAR system.

Several switches and splitters are illustrated in FIG. 9, as understood by the person of ordinary skill in the art. For example, a 1×3 splitter (940) distributes the optical power across three waveguides, typically uniformly by design, each having its own encoder (945). The encoder and switches are connected (950), for example, to CMOS control circuitry on a different chip packaged together with the photonic chip. In some embodiments, an electro-optical amplitude modulator can be used as an encoder (945), for example a PIN diode. Waveguides subsequently connect each encoder to its own optical phased array, e.g. (950). Each optical phased array may comprise a 1×N splitter (955), where N is determined, for example, according to the desired beamwidth and can be equal to 100-200.

In some embodiments, tapering is carried out only downstream (to the right) of section (960), for each optical path in the phased arrays. In other words, in some embodiments, the thickness of the Si material is the same through the system of FIG. 9, or it may be tapered from the lasers to the emitters, or it may be tapered in the terminal parts of the phased arrays, including section (960) and sections downstream of the vertical tape section (960). The emitters (965) can be tailored to emit at specific radiation angles $\theta$ and $\varphi$ for a given wavelength and phased array setting, specified for each emitter in the phased arrays. For example, each emitter in a phased array may emit at the same 0, with different phased arrays emitting at different $\theta$, or emitters in the same phased array may emit at different $\theta$ as well. For example, one phased array may emit at a fixed wavelength at $\theta_1$, while another phased array in the system may emit at a fixed wavelength at $\theta_2$, and a third phased array may emit at a fixed wavelength at $\theta_3$. Additionally, each phased array may be placed in a different orientation on the layout of the chip, to vary radiation angle cp. For example, each of the phased arrays in FIG. 9 may radiate at different $\varphi$ angles, or some arrays may emit at the same $\varphi$ but different $\theta$ angles. For example, angle $\varphi$ is greater than zero. Therefore, it is possible to vary both radiation angles $\theta$ and $\varphi$ for each scanner, according to the wavelength, to increase angular coverage, i.e. field of view, of the LiDAR system.

In the examples of FIG. 9, four lasers and three optical phased arrays are used. However, a different number of lasers or phased arrays may be used. The encoders, in some embodiments, fast amplitude modulators can be used with a time response of the order of nanoseconds.

Figure 10:
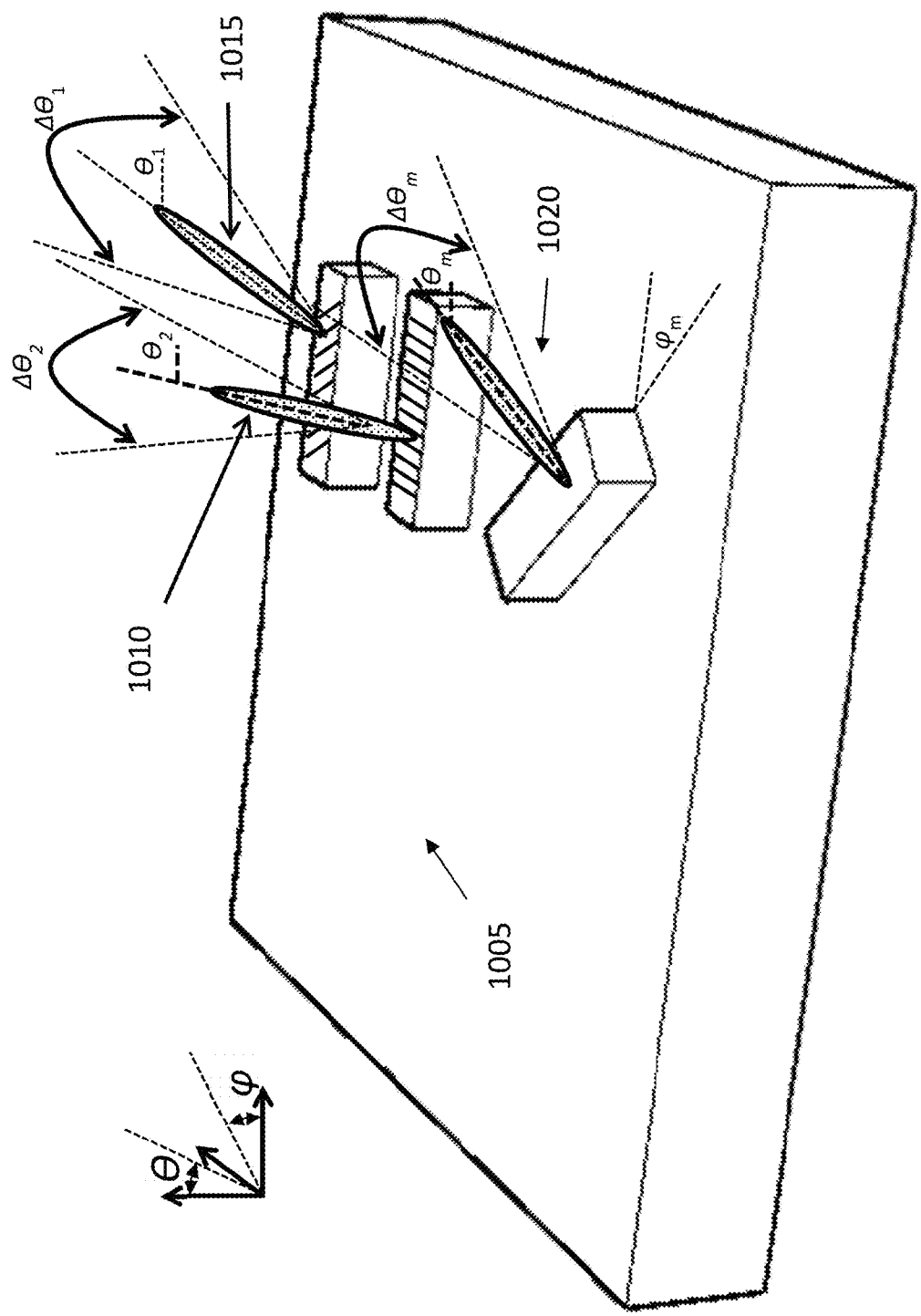
FIG. 10 illustrates an exemplary layout of different emitters.

FIG. 10 illustrates an exemplary layout of different emitter types, similarly to FIG. 9, but from a different perspective. In FIG. 10, several elements of the photonic circuit are not shown but can be present in (1005). Three exemplary beams are illustrated, (1010,1015,1020). Each beam is radiated from a 2D scanner at a specific wavelength and $\theta$ and $\varphi$ as described above with reference to FIG. 9.

Figure 11:
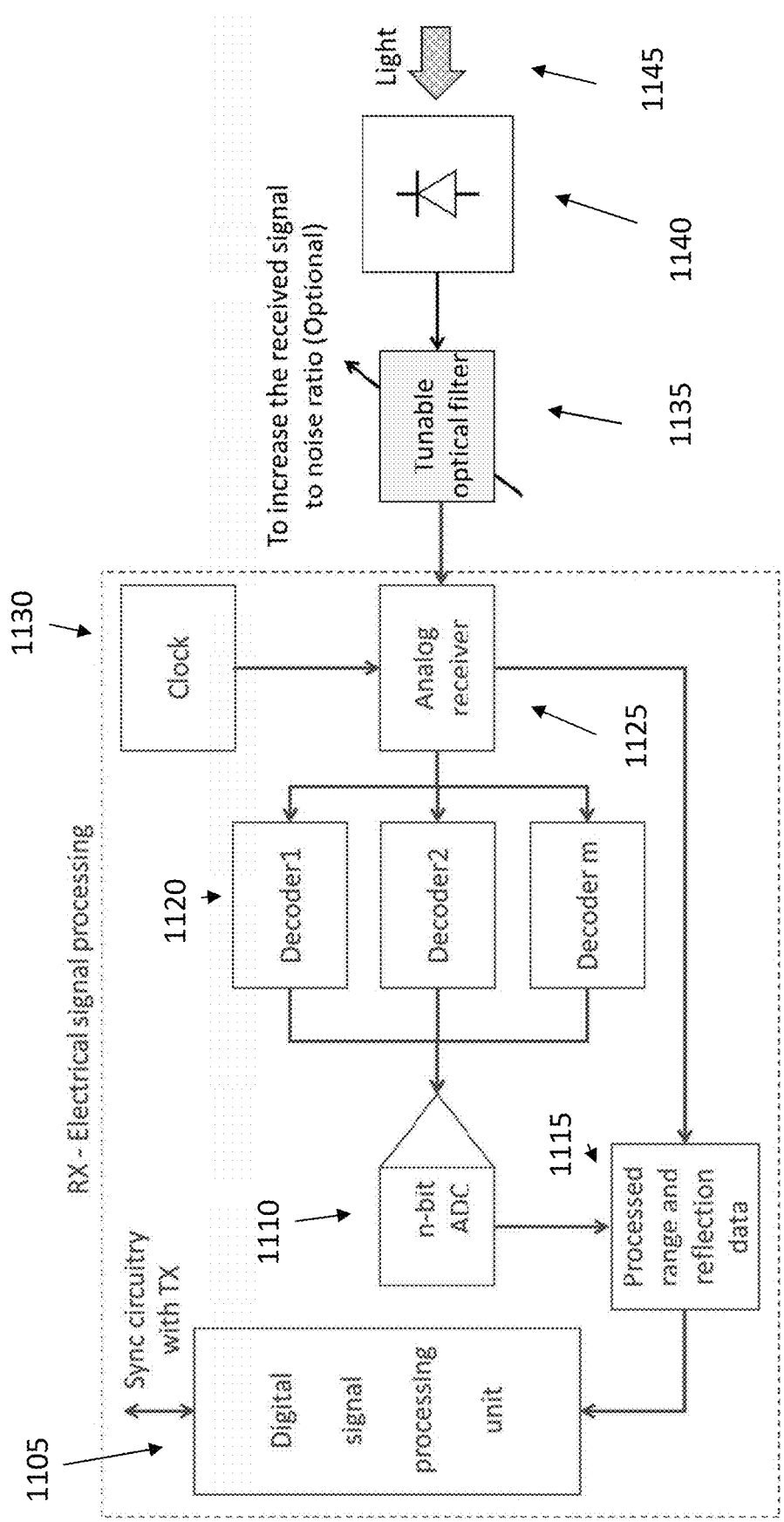
FIGS. 11-12 illustrate exemplary receiver architectures.

FIG. 11 illustrates an exemplary receiver architecture. For example, the signal processing may comprise: a digital signal processing unit (1105), which may sync with circuitry at the transmitter; an n-bit analog to digital converter (ADC, 1110), a plurality of decoders (1120), a clock (1130) and an analog receiver (1125). Light reflected from the environment after emission by the transmitter is received as illustrated in (1145), for example by an optical receiver with wide field of view, to maximize captured power (1140). The receiver may comprise a single photodiode, such as an avalanche photodiode (APD), with a large aperture, or an array of detectors to increase the received signal to noise ratio (SNR), or a phased array. In some embodiments, a tunable optical filter may be used (1135), to suppress noise and increase the received SNR. The processed range and reflectivity data (1115) are sent to the processing unit (1105).

Figure 12:
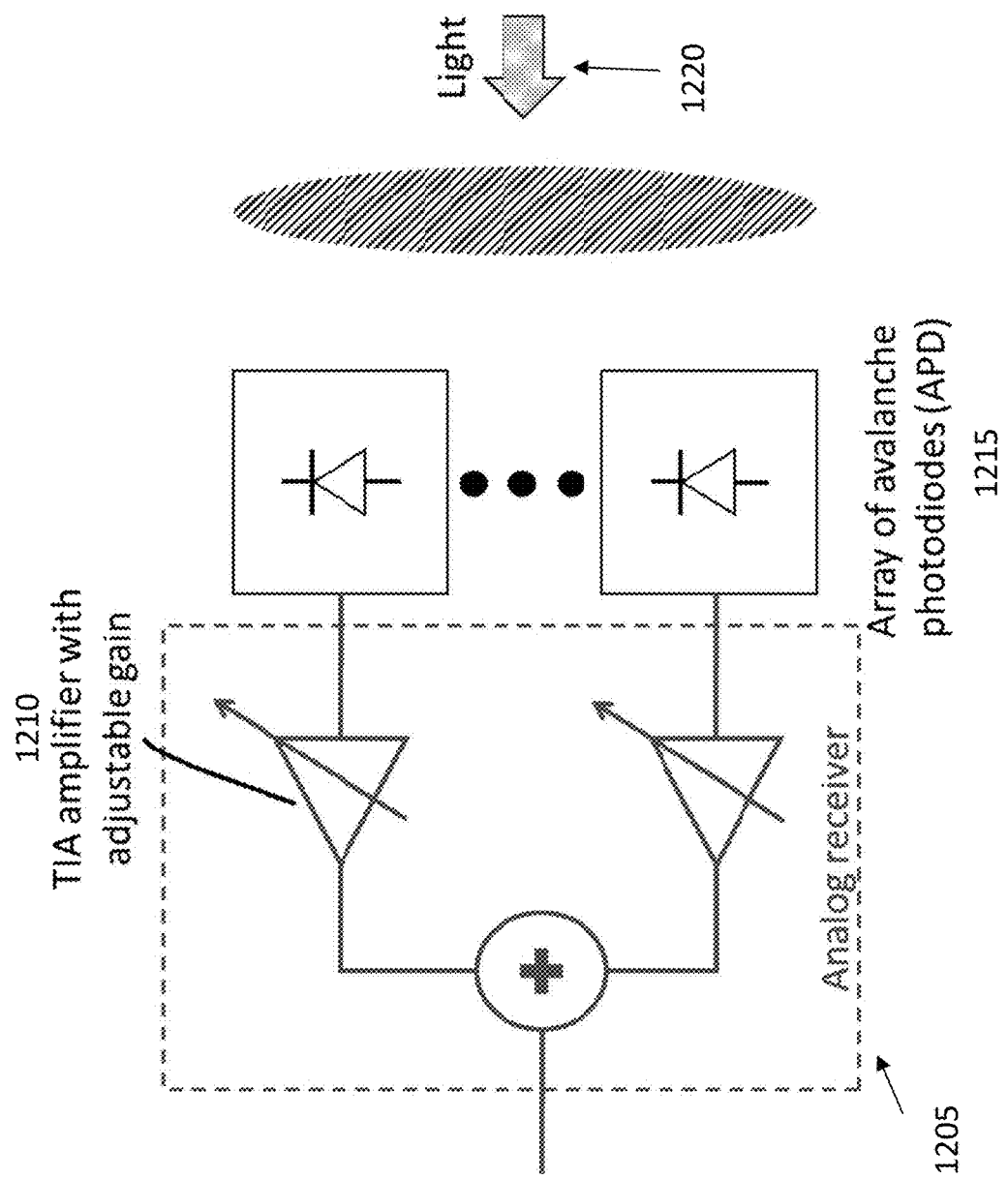

FIG. 12 illustrates an exemplary receiver architecture, front-ended with an array of avalanche photodiodes (APD) to increase gain. In this embodiment, the gain of each photodiode can be adjusted by controlling the bias voltage to maximize the received SNR. The light being received is illustrated (1220). The receiver comprises an array of avalanche photodiodes (1215) and an analog receiver (1205), comprising, for example, a transimpedance amplifier (TIA) with adjustable gain. A transimpedance amplifier is a current-to-voltage converter, usually implemented with an operational amplifier. The received electrical signal can be processed using similar blocks as illustrated in FIG. 11 (1130).

Figure 13:
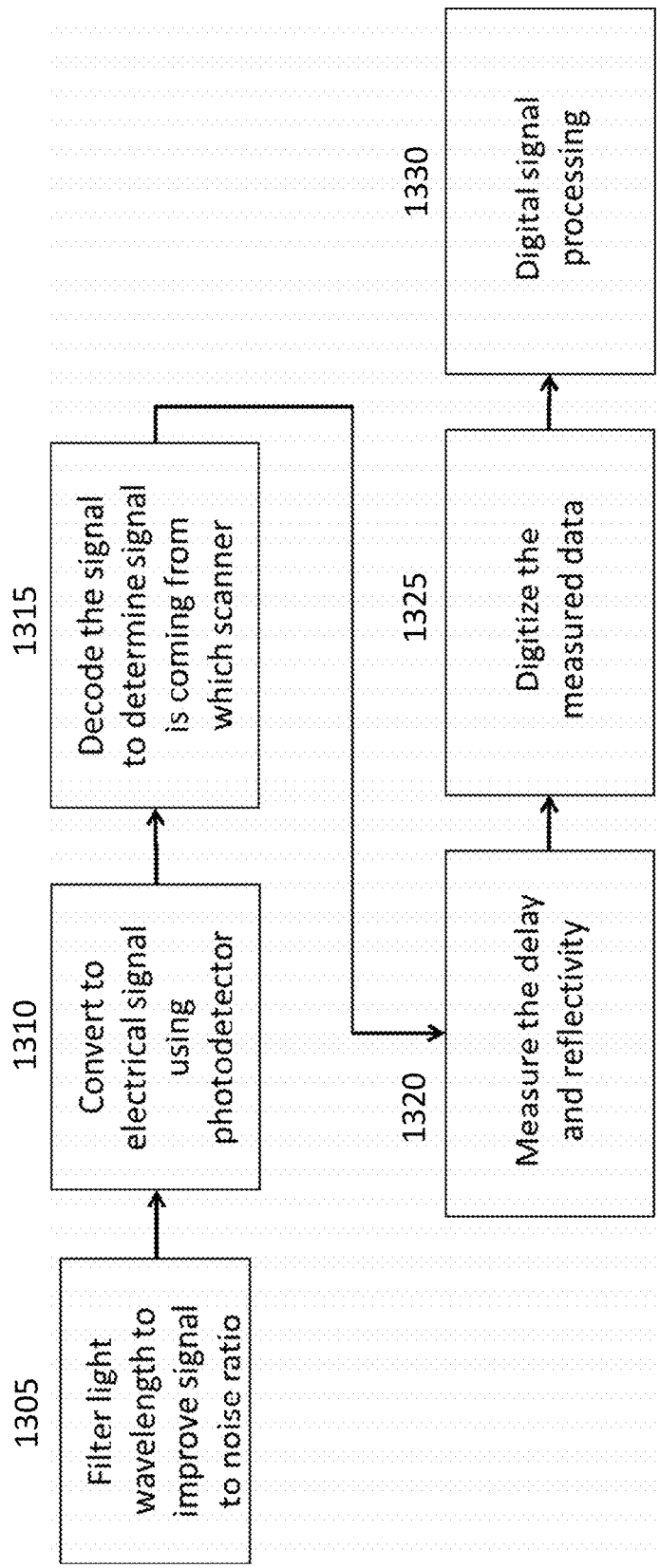
FIG. 13 illustrates an exemplary receiver signaling flow chart.

FIG. 13 illustrates an exemplary receiver signaling flow chart, comprising multiple steps, for example: filtering received light by wavelength to improve SNR (1305); converting to an electrical signal using a photodetector (1310); decoding the signal to determine from which scanner it originates from (1315); measuring the delay and reflectivity of the signal (1320); digitizing the measured data (1325); and processing the digital signal (1330).

Figure 14:
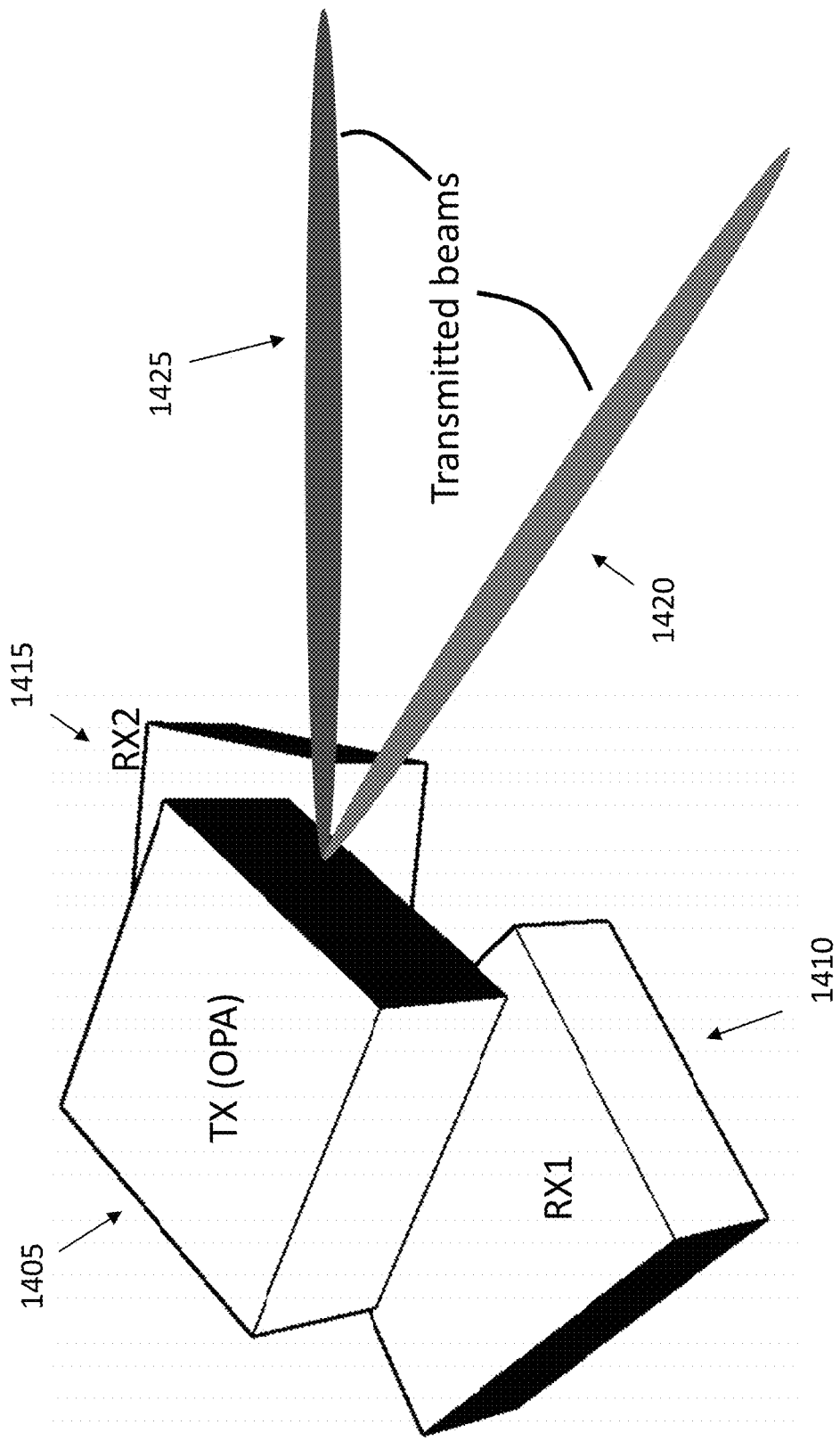
FIG. 14 illustrates an exemplary method of generating multiple beams from a transmitter, in use with a multi-receiver architecture.

FIG. 14 illustrates a way to increase the field of view by generating multiple beams at the transmitter, and using a multi-receiver architecture. For example, a phased array transmitter (1405), with architecture similar to that of FIG. 1, may emit multiple beams, e.g. two beams (1420) and (1425), in different directions simultaneously. Two receivers (1410,1415) are illustrated. Multiple receivers can be located relatively orthogonal to each other to create spatial selectivity on the receive path, to increase the effective field of view. For example, the receiver architecture may be realized as in FIGS. 11-12. In some embodiments, each beam (1420,1425) has a different wavelength. If the wavelength used is the same, then the beam can be oriented in a different direction. Alternatively, a single receiver may also be used, for example with pass band filters. In some embodiments, each beam from the same scanner may have different codes instead of sharing the same code. In some embodiments, the receiver may comprise a number of devices similar to the scanners (150,155) in FIG. 1, to receive light from the environment. In these embodiments the scanners can also receive power because of reciprocity. Using multiple beams and multiple receivers, the field of view of the LiDAR system can be increased, hence the number of scanned points per second is also increased. For example, the number of scanned points per second is doubled in the example of FIG. 14, due to the use of two simultaneous beams.

In some embodiments, the operating wavelength of the LiDAR scanner described herein is between 1 and 10 micrometers. The optical three dimensional imaging system disclosed herein can offer very fast scanning (number of sampling points per second), e.g. multi-$10^6$ points per second, by mixing wavelength, time and frequency encoding as well as spatial selectivity. The use of CMOS compatible silicon processing can offer much cheaper fabrication compared with existing systems. The presently disclosed LiDAR system can handle large optical power, enabling the ranging of long distances (such as hundreds of meters or a kilometer). Other advantages of the LiDAR system described herein are: Fast tuning of optical beam scanners using carrier injection modulators; an on-chip calibration scheme for the beam scanner using photodetectors; a high sampling rate for imaging; a combination of wavelength, time and frequency coding to increase throughput; all-semiconductor-based optical imaging system (a cheap and highly manufacturable solution); increasing field of view by sending multiple beams from the transmitter and using multiple receivers to scan spatially orthogonal regions; emitter design can be different for 2D scanners to optimize radiation efficiency.

Figure 15:
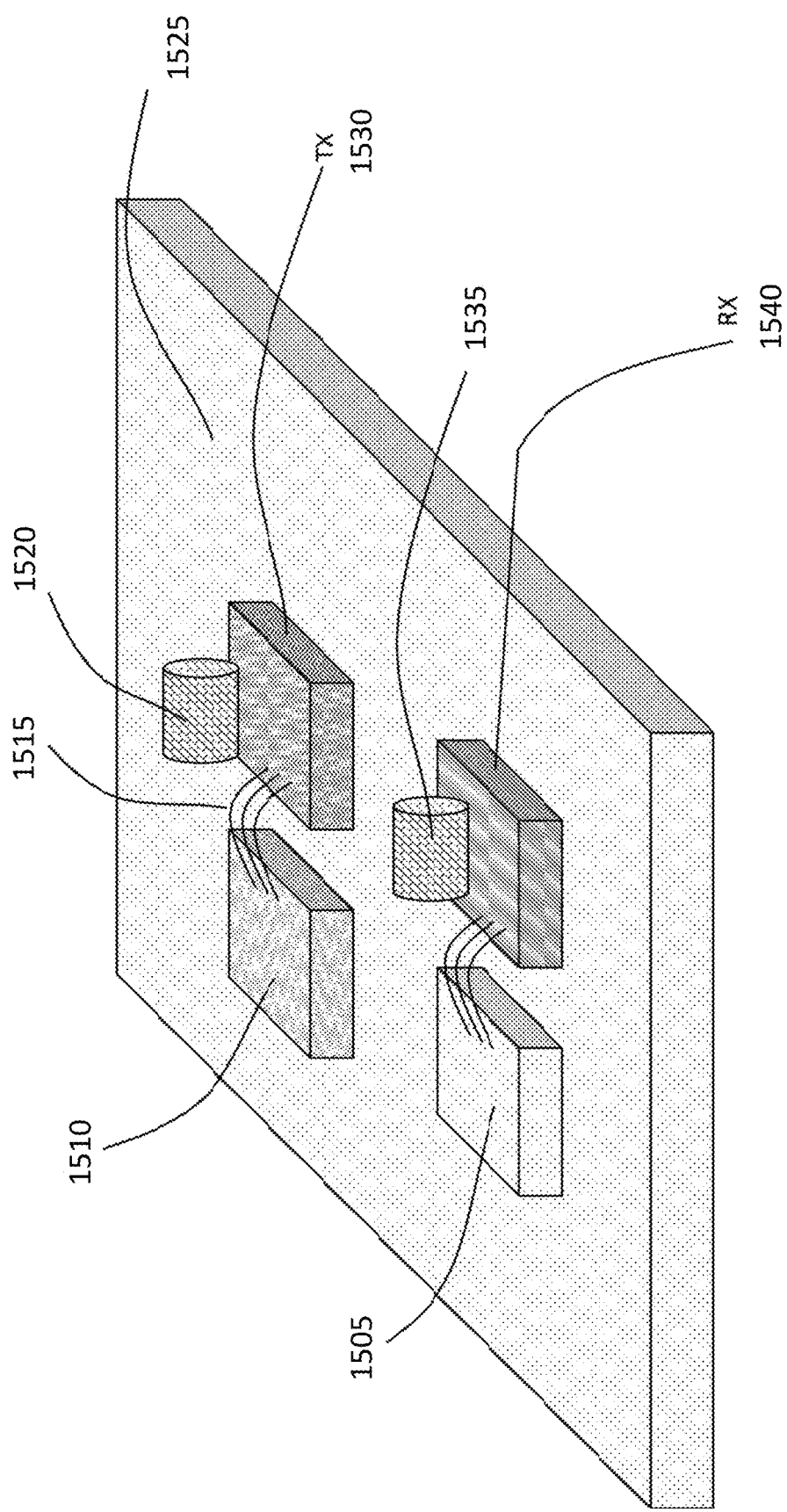
FIG. 15 illustrates an exemplary packaging of a LiDAR system.

FIG. 15 illustrates an exemplary packaging of a LiDAR system. For example, the system comprises: receiver electronics, e.g. an integrated CMOS chip (1505); a lens to maximize the power received by the receiver (1535); a carrier board, e.g. a printed circuit board (1525) to supply electronic chips, de-coupling capacitors, and provide synchronization clock and circuitries; electrical connections from the CMOS chip to the photonic chip, e.g. by wire bonding or bonding to photonic chips using through-silicon via (TSV) connections (1515); a lens to adjust the transmitter beamwidth (1520); transmitter electronic, e.g. an integrated CMOS chip (1510); a photonic transmitter (1530) and a photonic receiver (1540).

Figure 16:
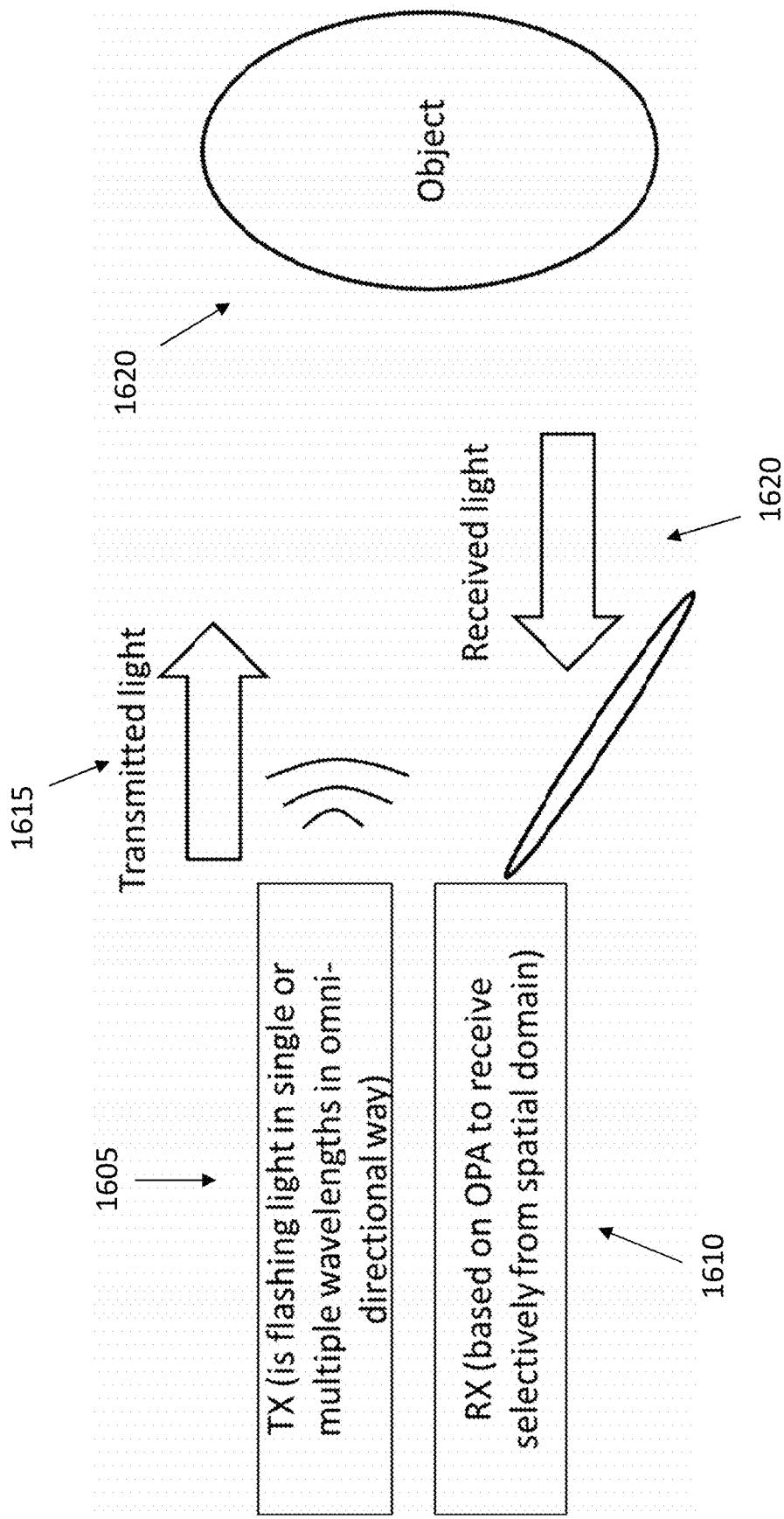
FIG. 16 illustrates other embodiments of LiDAR configurations.

FIG. 16 illustrates other embodiments of LiDAR configurations. For example, the transmitter (1605) can flash light in a single or multiple wavelength configurations in an omnidirectional way instead of using spatially targeted beams. The transmitted light (1615) is reflected by an object (1620) and received (1620) by a receiver (1610) based on an optical phased array which has spatial reflectivity. In other words, the receiver determines which light is coming from which direction. In this embodiment, an optical phased array can be used at the receiver to create spatial selectivity while the transmitter is transmitting light in all directions at least within the field of view of the receiver. In other embodiments, both the receiver and the transmitter can have spatial selectivity using an optical phased array architecture as illustrated in FIG. 1.

In some embodiments, a transmitter may comprise multiple scanners, each fabricated in a different geometrical orientation. In this way, each scanner covers a range of angles at a specific wavelength or range of wavelengths. By varying the laser wavelength, it is also possible to change the angle covered by the scanners, thus allowing tuning of the spatial direction and overall coverage of the LiDAR system. In some embodiments, the emitters in each 2D scanner will be encoded in the same way, but will have a different code compared to adjacent 2D scanner.

Figure 17:
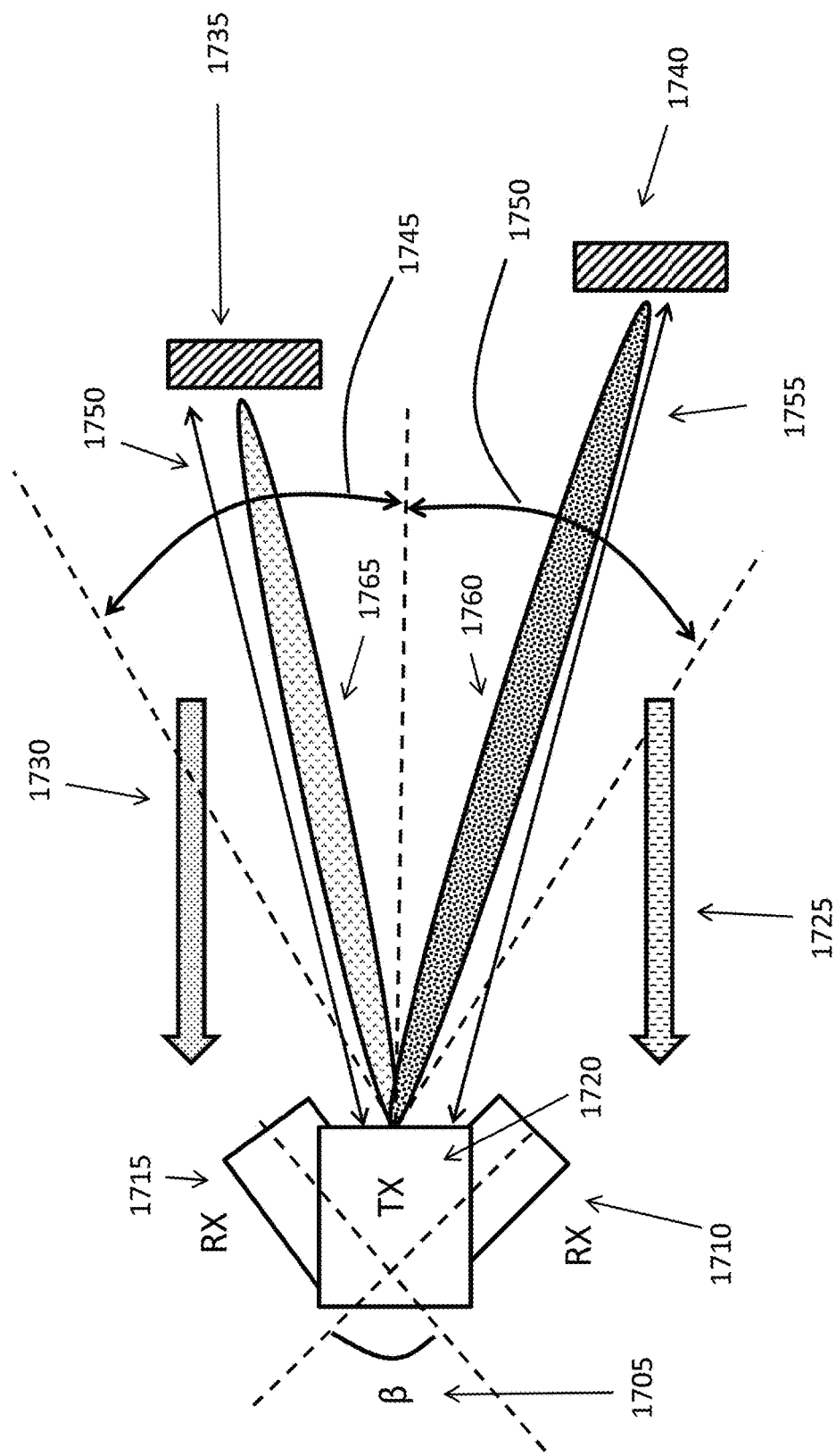
FIG. 17 illustrates a multi-receiver architecture.

FIG. 17 illustrates an example on how to increase the field of view by generating multiple beams and using multiple receivers. In some embodiments, multiple beams may be emitted by using two different wavelengths (e.g. through two lasers operating at different wavelengths) in a same scanner. In other embodiments, multiple beams may be emitted by using two scanners, each emitting at a different wavelength (e.g. through two lasers operating at different wavelengths). In yet other embodiments, a single wavelength may be used to emit two simultaneous beams in two different directions, by controlling the phased array and shape its beam to have two main lobes instead of a single main lobe.

In the example of FIG. 17, a transmitter (1720) emits two beams (1760,1765) at two different angles. The emitted beams are reflected by two objects (1735,1740) located at different distances (1750,1755) from the transmitter. Each of the two beams has a scanning range (1745,1750) over which the beam can be scanned by controlling the amplitude and phase of the emitters in the optical phased array in the transmitter. The light reflected (1730) by object (1735) and the light reflected (1725) by object (1740) are received by two receivers (1715,1710) which are oriented in different directions. For example, the angle between the longitudinal axis of the receivers can be termed (1705). The orientation angle (1705) of the receiver chips is optimized to maximize the received SNR at each receiver from the designated scanning area.

Figure 18:
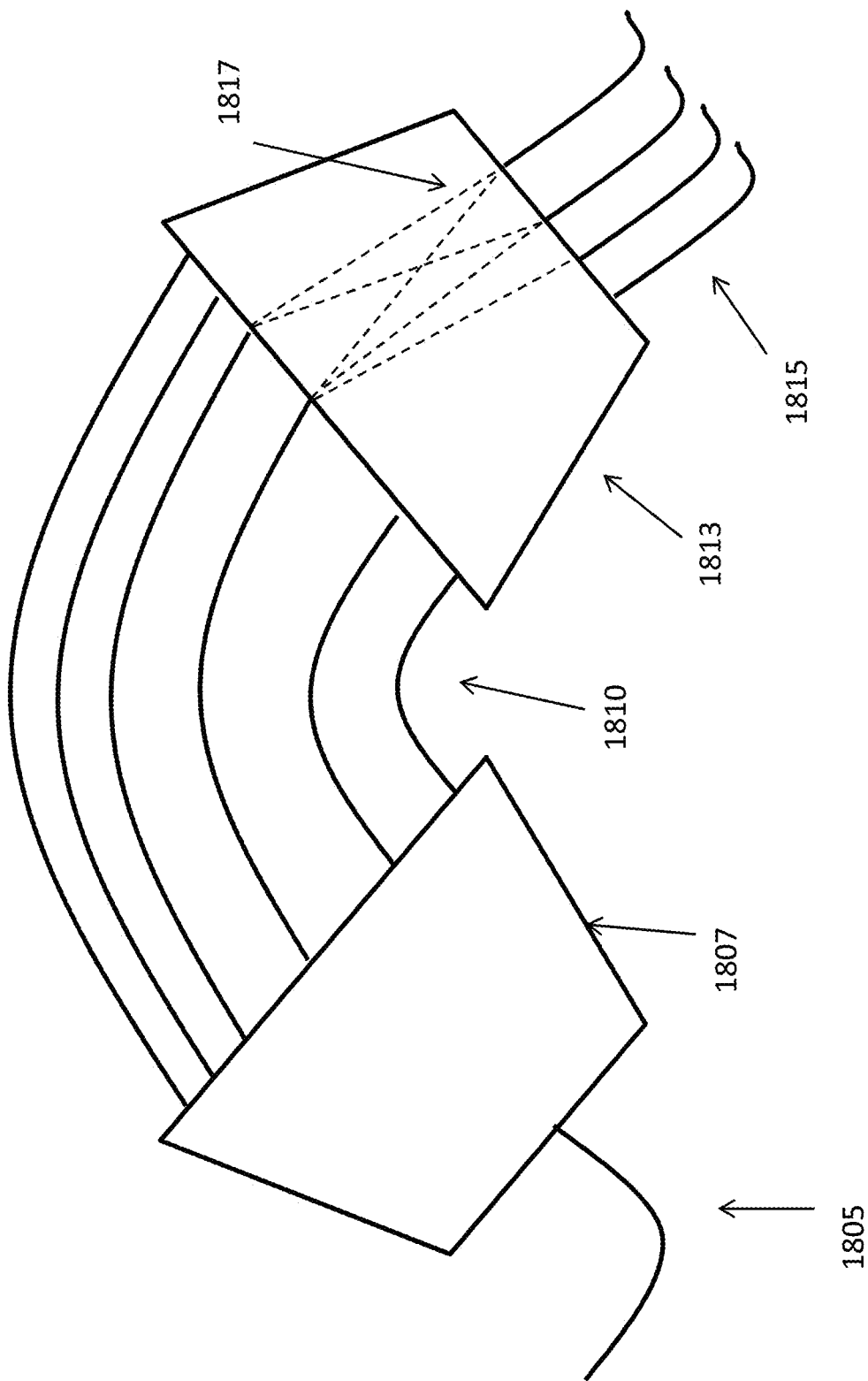
FIG. 18 illustrates an exemplary arrayed waveguide grating.

In some embodiments, the switches (115) of FIG. 1 can be substituted with one or more optical multiplexers, which can be implemented with an array waveguide grating. FIG. 18 illustrates an exemplary arrayed waveguide grating (AWG) which can be used for multiplexing a plurality of wavelengths. The arrayed waveguide grating is based on the wavelength dependent constructive interference of the delayed optical signals. The effect will create the constructive interference of different wavelengths in a specific location hence multiplexing different wavelengths or different wavelengths in different locations (demultiplexing). The different wavelengths (1815) from multiple lasers are input to the AWG and enter a free space propagation region (1813) followed by grating waveguides (1810). In some embodiments, the grating consists of a large number of waveguides with a constant length increment (AL). Each wavelength of light coupled to the grating waveguides (1810) undergoes a wavelength-dependent change of phase due to the constant length increment in the grating waveguides. Light diffracted from each waveguide of the grating (1810) into the second free space propagation (1807) interferes constructively (1817) and is refocused at the output waveguide (1805). The AWG can act as a MUX with negligible crosstalk between channels. Therefore, the K×1 switch (115) of FIG. 1 can be substituted by an AWG with K wavelengths ($\lambda_1, \lambda_k$) which are input to the AWG and output as a single wavelength. Instead of actively controlling the K×1 switch to select which laser is coupled through the rest of the LiDAR system, then MUX can be used to passively transmit the light from a single laser to the rest of the LiDAR system. The lasers can, for example, be current controlled to select which laser is transmitting its wavelength through the MUX. The AWG of FIG. 18 can also be used as a demultiplexer if used in the opposite orientation.

In some embodiments, a wavelength locker can be inserted after the MUX, using about 1-2% of power, to stabilize the laser and precisely control the wavelength of the laser. Otherwise, the wavelength of the laser may not be precise. The wavelength locker can, in some embodiment, relax the calibration requirements.

Figure 19:
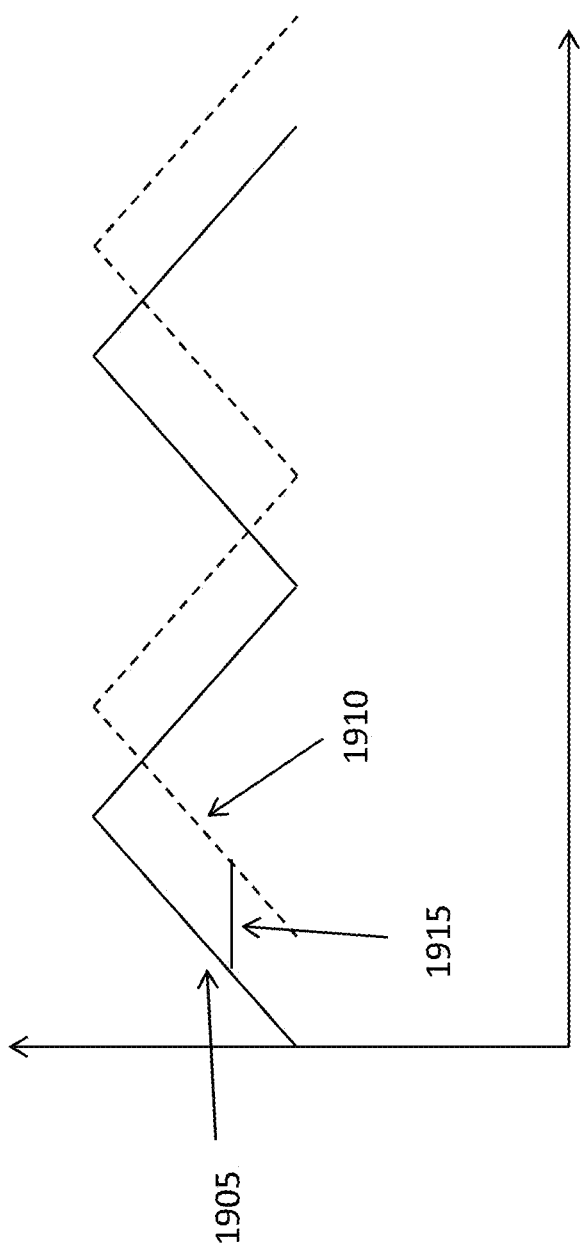
FIG. 19 illustrates a frequency modulated signal varied in time for coherent detection.

In some embodiments, with reference on the encoders (135) of FIG. 1, it is possible to add phase and amplitude modulation (PM and AM), enabling continuous wave (CW) operation. Pulsed operation requires a higher peak power, therefore, in some embodiments, CW operation may be advantageous. In some embodiments, the frequency of the signal transmitted by the LiDAR system onto surrounding object can be shifted over time, for example following a triangular wave modulation, as illustrated in FIG. 19. FIG. 19 illustrates the frequency of the signal in the y axis, as a function of time in the x axis. The signal emitted by the LiDAR system is illustrated as (1905), while the reflected signal is illustrated as (1910). The light reflected from the object is shifted by the amount $\tau$ (1915). In some embodiments, light at the first emitted frequency and the light at the second reflected frequency can be mixed to obtain a beat (the difference between the two frequencies). For example, two sinusoidal signals can be used to obtain a beat. The difference between the two frequencies (1905,1910) will be proportional to $\tau$.

In some embodiments, the LiDAR system can perform adaptive tracking. For example, the system can lock onto a visible object and track it. For example, an object may have a specific reflection that can render it readily identifiable. The system can also lock onto moving object, for example following a child moving within the visible frame, or tracking the rise and fall of a breathing chest, to track the health conditions of a human being.

The light emitted by the system may also have, in some embodiments, a penetration depth of a few mm, or less than a mm. This would enable health monitoring, for example capturing a heartbeat as well as breathing.

In some embodiments, the wavelength ranges of each laser can be, for example, 1500-1520 nm, 1520-1540 nm, and so on in increments of 20 nm up to 1580-1600 nm. In some embodiments, the scanners may be 2D or 1D. In some embodiments, the 1D scanners control the angle $\theta$ emitted by the scanner's optical phased array at a specific wavelength, by controlling the phase of the light emitted by the emitters of the phased array. In other embodiments, the 2D optical phased array can control both $\theta$ and $\varphi$ emission angles at a specific wavelength. The wavelength can be controlled by switching the light from one of the lasers of the system. If using a 1D scanner, it is possible to have sub-micrometer spacing between emitters. In this embodiment, the wavelength can be used to sweep. In some embodiments, if using 2D scanners, both angles can be varied by controlling the phased array (by changing the phase and amplitude) instead of varying the wavelength. In some embodiments, $\theta$ can be defined as the angle $\theta$ in FIG. 10, i.e. along a plane normal to the horizontal plane of the device (as seen in FIGS. 9-10); $\varphi$ can be defined in a plane normal to the plane of $\theta$, and comprising the longitudinal axis of a scanner (such as the right direction in FIG. 8).

In some embodiments, the angular width of the main lobe of an emitted beam can be defined as the width value at a 3 dB intensity drop from the peak value of far field pattern. The present disclosure describes a system that has a reconfigurable field of view. The field of view can be customized according to the specific application. Scanning can be carried out by selecting a wavelength, as the emitters of a phased array will emit at different angles according to the input wavelength. Scanning resolution and rate can be increased in a specific region of the field of view, increasing the flexibility of the system, as more resources can be applied to scan specific regions. In some embodiments, multiple input wavelengths can be applied at the same time as an input to one or more phased arrays in the system. In some embodiments, different lasers operating in different wavelength ranges are present in the system, and a switch allows controlling the emission angle $\theta$ by changing the input wavelength (selecting the laser). In some embodiments, $\varphi$ can be controlled by the electronic input of the optical phased array. In some embodiments, calibration diodes are included to allow on-chip calibration by detecting a portion (e.g. 1-5%) of the emission light. This portion of light is captured by the diodes. As known to the person of ordinary skill in the art, calibration of current LiDAR ranging system is a difficult task. On-chip calibration integrated in the system can be advantageous. In some embodiments, the photonic chip may be fabricated in Si, or other materials, such as III-V semiconductors. In some embodiments, the control circuitry for digital processing may be based on CMOS, or other processes such as BiCMOS (a combination of bipolar and CMOS technology), or field-programmable gate array (FPGA), or others.

In some embodiments, a grating coupler can be used as an emitter. The system may also calculate a range and reflectivity, velocity and Doppler shift of objects in the environment. In some embodiments, it is possible to control the number of emitters which are transmitting to change the pitch. For example, half of the emitters can be turned off to change the pitch, since the pitch is determined by the distance between the active emitters. Therefore, the LiDAR system described herein is reconfigurable.

In some embodiments, it is possible to change the thickness of the optical transmission material. For example, if Si is used, its thickness may be varied, in the waveguides and other optical components. The power at the laser side is gradually split between multiple channels as the optical signals move towards the emitters. For example, the light of one laser is ultimately split between a great number of emitters. Therefore, the thickness required to safely carry that power is greater at the laser side and can be gradually decreased moving towards the emitters' side. For example, the Si may have a thickness of 3 micrometer at the laser side, and gradually decrease down to 1 micrometer at the emitter side, as the light is split between a greater number of components. A similar feature can be implemented at the receiver's side.

In some embodiments, the transmitter enables spatial selectivity as the optical phased array can direct the mean beam spatially. The receiver may also have spatial selectivity to determine from which location the beam is reflected from, for example enabling light of sight applications. In some embodiments, a flood transmitter may be used, while the receiver has spatial selectivity. In some embodiments, both receiver and transmitter may have spatial selectivity. The LiDAR system described herein may work at different wavelengths, including the visible range.

In some embodiments, a transmitter can emit optical radiation. Part of the optical radiation can be transmitted as two different wavelengths, through a nonlinear material, to create a beat of the two wavelengths and obtain a frequency in the THz range (e.g. a few THz). The two different wavelengths are close to each other in value, in order to generate a beat. In some embodiments, the frequency can be in a range lower than THz). As known to the person of ordinary skill in the art, a beat is an interference pattern between two waves of slightly different frequencies, perceived as a periodic variation in intensity whose rate is the difference of the two frequencies. For example, if two sinusoidal waves are at 193 THz and 194 THz, a beat can be obtained as a sinusoidal wave at a frequency equal to the difference of the frequencies of the two original waves, e.g. 1 THz in this example. For example, wavelengths of 1550 nm and 1558 nm could be used, having a difference of 8 nm, which enables a beat of 1 THz. As another example, a difference of 0.8 nm will give a frequency of 100 GHz. Therefore, in some embodiments, to generate a beam in the THz range, the difference between wavelengths is 8 nm or more.

In some embodiments the system can comprise components to create the THz beam, as well as the LiDAR system described above in the present disclosure, to emit an optical beam. Therefore, the systems of the present disclosure can emit both a THz beam and an optical beam.

After the optical and THz beams are transmitted and/or reflected by an object, the optical and THz radiation can be collected at an optical receiver and a THz receiver. The signals can then be processed with adaptive post processing. In some embodiments, the optical system is a LiDAR system as described in the present disclosure. The LiDAR system is enhanced by further comprising components for the THz beam operation. The optical and THz radiation are used together for spectroscopy applications. For example, the optical LiDAR can carry out 3D imaging, enhanced by the THz spectroscopy.

Multiple tunable lasers can be used, each operating in a different sub-band wavelength range. A subsequent stage of the system can comprise a plurality of wavelength lockers. The wavelength lockers enable the elimination of phase noise in the laser output, and can be implemented in different ways. For example, a feed-forward or a feedback methodology could be used. The lasers and wavelength lockers can be controlled through associated circuitry, e.g. CMOS circuitry on the same chip or a different chip.

In a stage subsequent to the wavelength lockers, encoders can enable encoding of the amplitude and/or phase of optical signals. In some embodiments, each wavelength locker transmits a signal at a different wavelength. The wavelengths entering the encoders will be clean due to the removal of phase noise. Each wavelength can therefore be encoded by the plurality of encoders. For example, a digital code could be used, where each wavelength has an associated square wave pulse. In some embodiments, the wavelength lockers output an optical signal centered around a respective wavelength, with a narrow wavelength band centered at the respective wavelength. In some embodiments, the encoders, as a whole, can provide a series of consecutive square waves, each centered at a respective wavelength. In some embodiments, the encoders can be replaced by amplitude and phase modulators, as described in the present disclosure.

In a stage subsequent to the encoders, a broadband combiner can enable the combination of different wavelengths into a single optical signal. This optical signal comprises a plurality of clean wavelengths which can be emitted as a beam onto an object. For example, the beam may comprise a plurality of wavelengths emitted simultaneously, or a plurality of wavelengths emitted consecutively in time, each wavelength, or narrow range of wavelengths, emitted consecutively in time. The plurality of wavelengths can be directed as a beam at a specific point of the sample, with the beam scanning across the surface of the sample. Alternatively, the beam can be broad enough to cover the entire surface of the sample, in which case scanning is not necessary. In some embodiments, only the part of the sample which is of interest may be irradiated.

At the receiver, collecting light transmitted or reflected by the sample, the wavelengths can be separated, and each wavelength can be sent to a sub-band detector. In a subsequent stage, the different sub-band detectors can input their signal to a decoder and spectrum data processing module, followed by a digital signal processing module, e.g. implementing adaptive learning.

In the embodiments where the beam is scanned across the surface of the sample, the scanner can be implemented in different ways. In some embodiments, the scanner is implemented with an optical phased array. The optical phased array can, for example, electronically steer the beam in a desired direction. The optical phased array can, in some embodiments, emit two or more beams at the same time, by modifying the number and intensity of lobes emitted. For example, the two beams may irradiate different regions of the sample, or even different samples. In some embodiments, the emitters of the optical phased array are configured to emit a beam in the same spatial direction (i.e. the same emission angle) for different wavelengths.

The receiver is then configured to interpret the reflectivity data as a function of wavelength, as well as being able to distinguish the signal originating from different objects. For example, if two beams are emitted, each at a different object, the receiver can distinguish the signal reflected from each object due to the different encoded beams being used.

In some embodiments, 3D imaging of the sample is carried out through the optical phased array system, and additionally, multiple wavelengths are illuminated at each point of the sample. The different wavelengths may be transmitted simultaneously on the same point of the sample, or serially in time, for example with a very short time separation. In addition to measuring the reflected radiation as described above in the present disclosure, the reflectivity of the sample can be measured as a function of the optical wavelength and of the THz frequency, as well as the angles of reflection or reception. For example, the reflectivity can be measured as a function of $\theta$ and $\varphi$ as discussed with reference to the optical phased array in the present disclosure.

By using THz radiation together with the LiDAR system, an opto-THz spectroscopy system can be fabricated. The THz beam can be an additional beam to illuminate the sample. The THz beam can be generated as described above, through creation of a beat tone. The wavelengths used to beat can vary over time due to normal fluctuations in the laser or other components of the system. These variations can negatively affect the beat, as one wavelength may diverge from the other, increasing or decreasing their difference. As a consequence, the beat may vary and exit the THz range. Therefore, wavelength lockers can be used to track and lock the two wavelengths used to generate the THz beat.

Figure 20:
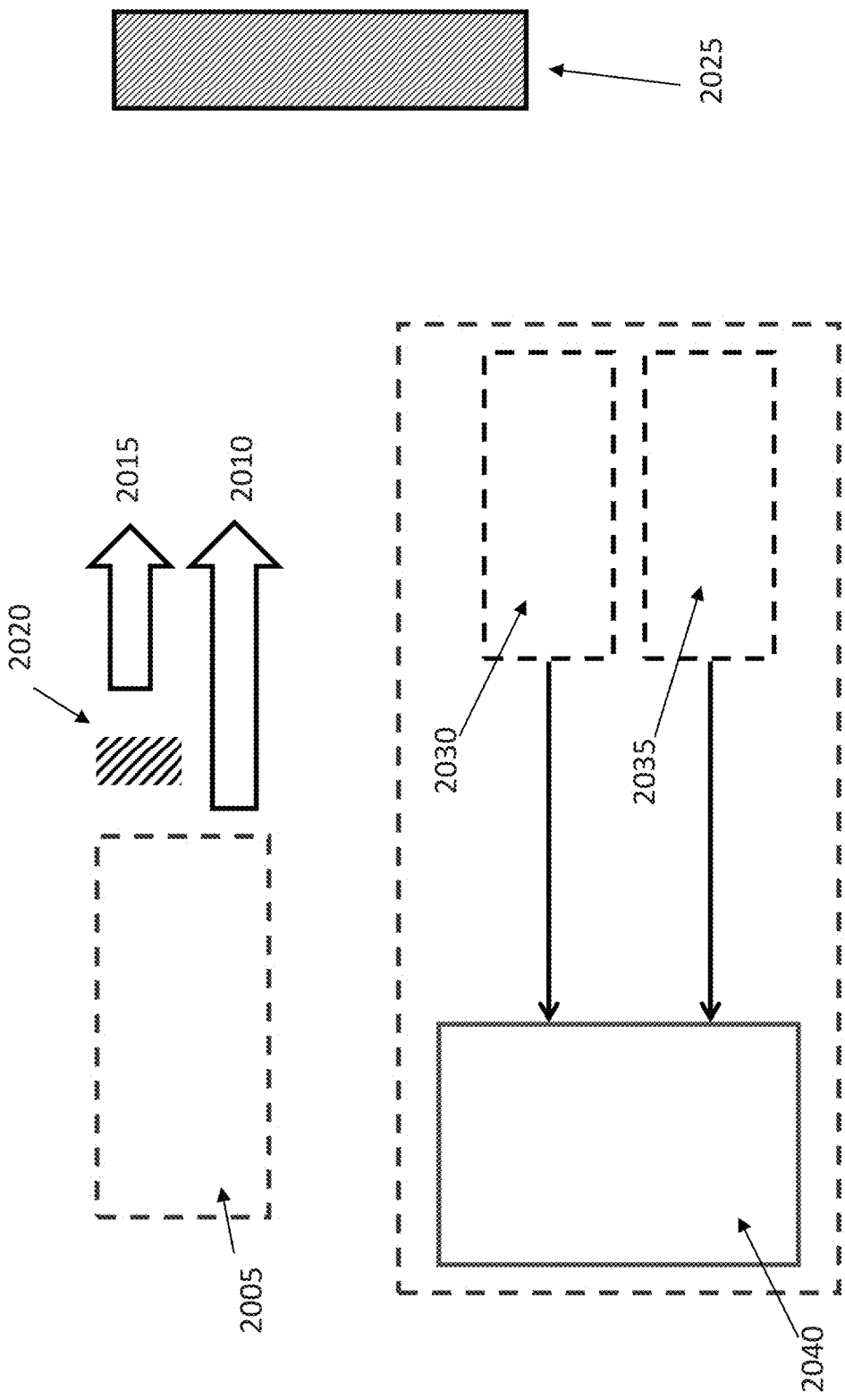
FIG. 20 illustrates an exemplary opto-THz spectroscopy system, where the transmitter emits both optical radiation as well as Thz radiation generated as a beat tone of two close enough wavelengths using a non-linear material.

FIG. 20 illustrates an exemplary opto-THz spectroscopy system, where the transmitted combined wavelengths are emitted as optical radiation and as THz radiation generated by wavelengths beat together by a non-linear material to beat the two wavelengths and generated a THz beam. FIG. 20 illustrates a transmitter (2005), emitting an optical beam (2010) and a THz beam (2015), generated through a non-linear material (2020). Both beams illuminate an object (2025). The radiation reflected by the object is collected at the optical receiver (2035) and the THz receiver (2030), for adaptive post-processing (2040).

Figure 21:
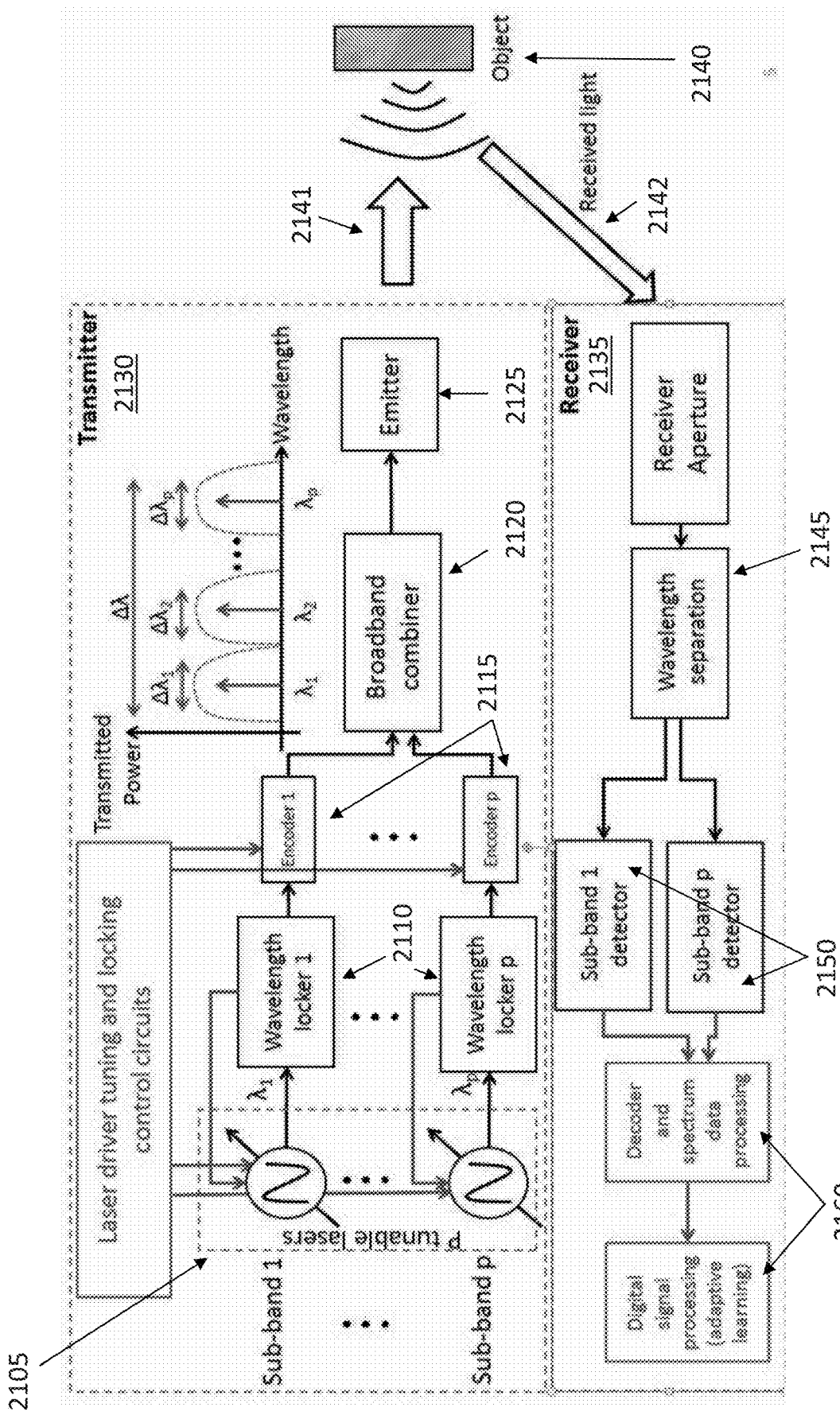
FIG. 21 illustrates an exemplary spectroscopy system working at multiple wavelengths, each separately locked and encoded.

FIG. 21 illustrates an exemplary spectroscopy system working at multiple wavelengths, each separately locked and encoded. A plurality of tunable lasers (2105) generates a plurality of wavelengths, which are inputted to wavelength lockers (2110) and subsequently to encoders (2115), broadband combiners (2120) and emitters (2125). The above components are part of the transmitter (2130). The light (2141) reflected (2142) from an object (2140) is received at the receiver (2135), which separates the wavelengths (2145) for different sub-band detectors (2150), followed by decoding and other digital signal processing (2160).

In some embodiments comprising a LiDAR-based and THz spectroscopy system, the spectroscopy beams are scannable, thereby giving depth (spatial) information in addition to reflectivity (reflected intensity) as a function of wavelength/frequency. Other embodiments can include transmitted intensity and transmitted wavelength for spectroscopy that passed through a target object rather than be reflected off. In some embodiments, the non-linear material is configured to create a beat wave from two wavelengths, the beat wave having a frequency between 1 and 100 THz.

As used herein, the range of 1 to 100 THz will be the "THz band" referring to the beat frequencies, and the range of 101-1000 THz will be the "optical band" referring to the optical and near-optical laser frequencies. In one embodiment, the laser frequencies will be in the "visible band", from 430-770 THz.

In some embodiments, the receiver is capable of separating the incoming signal in different wavelength bands. The receiver also comprises a THz detector to receive the THz part of the beat tone.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

1. H. Abediasl and H. Hashemi, "Monolithic optical phased-array transceiver in a standard SOI CMOS process," Optics Express, vol. 23, no. 5, pp. 6509-6519, March 2015.
2. S. Chung, H. Abediasl and H. Hashemi, "A 1024-element scalable optical phased array in 180 nm SOI CMOS," in IEEE International Solid-State Circuits Conference (ISSCC) Digest of Technical Papers (2017).
3. C. V. Poulton et. al. "Optical Phased Array with Small Spot Size, High Steering Range and Grouped Cascaded Phase Shifters." In Integrated Photonics Research, Silicon and Nanophotonics Optical Society of America 2016.
4. U.S. Pat. No. 9,476,981 "Optical phased arrays"

What is claimed is:
1. A device comprising:
   a plurality of tunable lasers generating a plurality of wavelengths;
   a plurality of wavelength lockers to reduce wavelength noise from the plurality of wavelengths;

a plurality of encoders, each encoder configured to encode light of a wavelength locker of the plurality of wavelength lockers;

at least one broadband combiner to combine outputs of the plurality of encoders;

a plurality of emitters connected to the at least one broadband combiner; and a non-linear material configured to create a beat wave from two wavelengths, the beat wave having a frequency between 1 and 100 THz.

2. The device of claim 1, wherein each emitter of the plurality of emitters comprises a grating coupler.

3. The device of claim 1, wherein the plurality of encoders is configured to encode amplitude of the light, phase of the light, or both amplitude and phase of the light.

4. The device of claim 1, wherein the plurality of lasers operates in pulsed mode.

5. The device of claim 1, wherein the plurality of lasers operates in frequency modulated continuous wave mode.

6. The device of claim 1, wherein the device comprises Si, and a thickness of Si decreases progressively from a first side of the device comprising the plurality of lasers, to a second side of the device comprising the plurality of emitters.

7. The device of claim 6, wherein the thickness of Si at the first side is 3 micrometers, and the thickness of Si at the second side is 1 micrometer.

\* \* \* \* \*